(12) United States Patent
Kim

(10) Patent No.: US 11,446,817 B2
(45) Date of Patent: Sep. 20, 2022

(54) CONTROL SYSTEM TO CONTROL INTELLIGENT ROBOT DEVICE

(71) Applicant: LG ELECTRONICS INC., Seoul (KR)

(72) Inventor: Taehyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 376 days.

(21) Appl. No.: 16/599,910

(22) Filed: Oct. 11, 2019

(65) Prior Publication Data
US 2020/0039068 A1 Feb. 6, 2020

(30) Foreign Application Priority Data
Aug. 21, 2019 (KR) .................. 10-2019-0102525

(51) Int. Cl.
*B25J 9/16* (2006.01)
*G06T 7/246* (2017.01)
*G05B 13/02* (2006.01)
*G06V 40/20* (2022.01)

(52) U.S. Cl.
CPC ............ *B25J 9/163* (2013.01); *G05B 13/027* (2013.01); *G06T 7/246* (2017.01); *G06V 40/20* (2022.01); *G06T 2207/20081* (2013.01); *G06T 2207/20084* (2013.01); *G06T 2207/30196* (2013.01); *G06T 2207/30241* (2013.01)

(58) Field of Classification Search
CPC .......... B25J 9/161; B25J 9/163; B25J 11/008; G05B 13/027; G06Q 10/063; G06Q 50/10; G05D 1/0297; G06N 3/08
See application file for complete search history.

(56) References Cited

U.S. PATENT DOCUMENTS

| | | | | |
|---|---|---|---|---|
| 2010/0161831 A1* | 6/2010 | Haas | ............ | H04L 67/289 709/235 |
| 2013/0278501 A1* | 10/2013 | Bulzacki | ............ | G06K 9/627 345/157 |
| 2018/0029226 A1* | 2/2018 | Dani | ............ | G06V 10/10 |
| 2019/0118091 A1* | 4/2019 | Taylor | ............ | A63F 13/25 |
| 2021/0170585 A1* | 6/2021 | Kim | ............ | G06N 20/00 |

FOREIGN PATENT DOCUMENTS

CN 110509270 A * 11/2019

* cited by examiner

*Primary Examiner* — Peet Dhillon
(74) *Attorney, Agent, or Firm* — Fish & Richardson P.C.

(57) ABSTRACT

A method of identifying a behavior direction recognition based service requester includes a plurality of intelligent robot devices arranged in the airport and a server controlling movement of one or more intelligent robot devices of the plurality of intelligent robot devices. The intelligent robot includes a communication unit transmitting movement information of an airport user moving in the airport from the server, and a processor configured to receive the movement information of the airport user from the communication unit, learn movement of the airport user, recognize a wandering state of the airport user based on the learned movement of the airport user, and move to the airport user based on a result of the recognition. The intelligent robot device may be associated with an artificial intelligence module, an unmanned aerial vehicle (UAV), a robot, an augmented reality (AR) device, a virtual reality (VR) device, and devices related to 5G services.

15 Claims, 23 Drawing Sheets

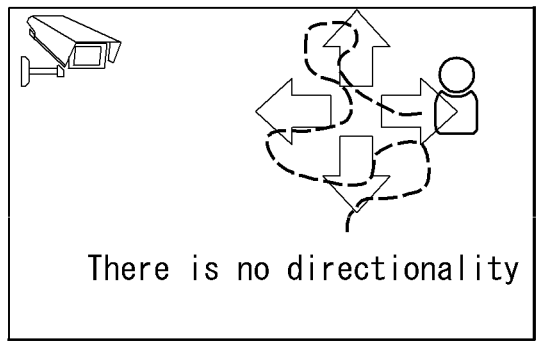
<Wanderer with no destination>
FIG. 18A
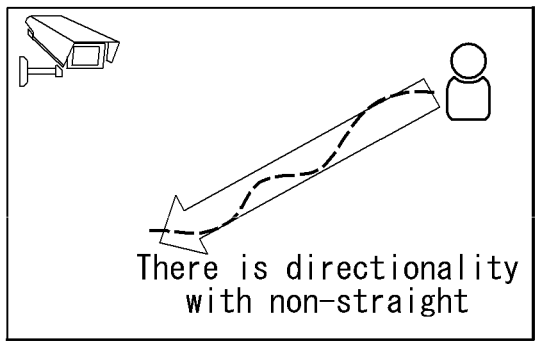
<Person with definite destination>
FIG. 18B
FIG. 19
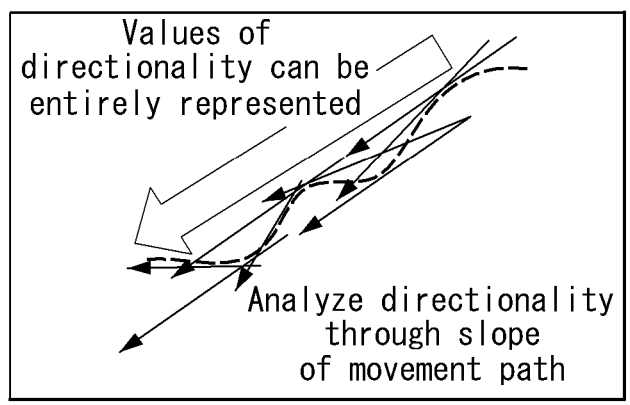

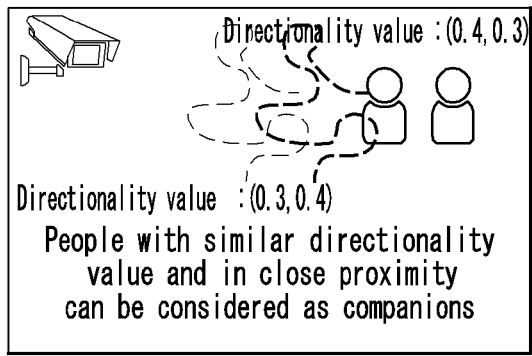 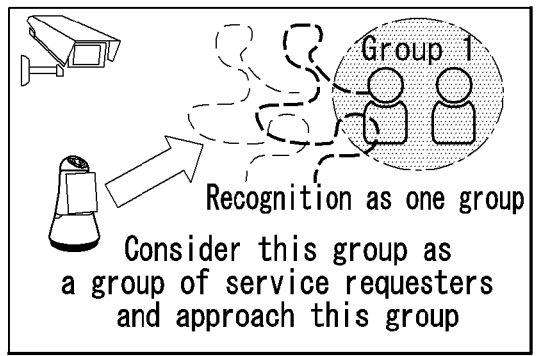
FIG. 21A     FIG. 21B
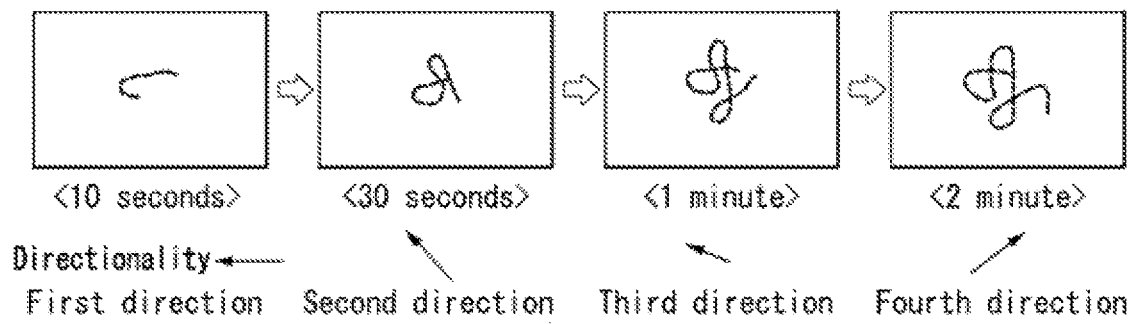
FIG. 22A
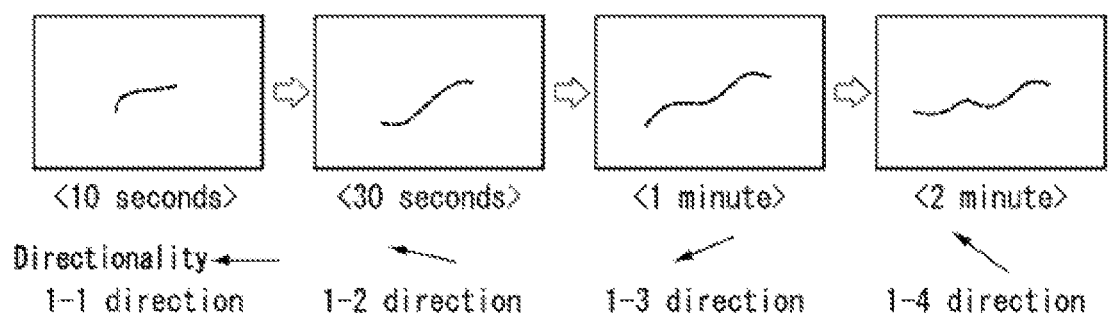
FIG. 22B

FIG. 23

| Airport User | Coordinates | Directionality | Movement |
|---|---|---|---|
| A | (3, 10) | No | Yes |
| B | (3, 8) | No | Yes |
| C | (4, 26) | Right | Yes |
| D | (5, 23) | Left | Yes |
| E | (23, 8) | No | No |
| F | (23, 7) | No | No |

CONTROL SYSTEM TO CONTROL INTELLIGENT ROBOT DEVICE

CROSS-REFERENCE TO RELATED APPLICATION

This application claims the priority benefit of Korean Patent Application No. 10-2019-0102525, filed on Aug. 21, 2019, which is incorporated herein by reference for all purposes as if fully set forth herein.

BACKGROUND OF THE INVENTION

Field of the Invention

The present disclosure relates to a method of identifying a behavior direction recognition based service requester, and more particularly to a method of identifying a behavior direction recognition based service requester capable of providing best airport services to airport users by learning movement information of the airport users, determining whether or not airport services are necessary based on a result of the learning, and approaching an airport user which requires the airport services based on a result of the determination.

Discussion of the Related Art

Recently, in order to provide more efficiently various services to users in public places such as airport, introduction of robots, etc. is being discussed. The users can use various services including navigation service in the airport, boarding information guide service, and other multimedia contents provision service, and the like through robots placed at the airport.

However, since the unit cost of high tech devices such as robots is high, the number of airport robots placed in the airport may be limited. Therefore, a method may be required to provide more efficient services using the limited number of airport robots.

In particular, in case of airport robots providing the navigation service in the airport, it may be inefficient that the respective airport robots provide the navigation service while moving to all areas of the airport.

SUMMARY OF THE INVENTION

An object of the present disclosure is to address the above-described and other needs and/or problems.

Another object of the present disclosure is to provide a method of identifying a behavior direction recognition based service requester capable of providing best airport services to airport users by learning movement information of the airport users, determining whether or not airport services are necessary based on a result of the learning, and first approaching an airport user which requires the airport services based on a result of the determination.

Another object of the present disclosure is to improve reliability of a method of identifying a behavior direction recognition based service requester by controlling an intelligent robot device through AI processing.

In one aspect of the present disclosure, there is provided a method of identifying a behavior direction recognition based service requester, the method comprising tracking a plurality of users in a captured image to obtain movement information of the plurality of users; learning the obtained movement information of the plurality of users; determining whether or not the user is in a wandering state based on the learned movement information of the user; and determining whether or not an intelligent robot device approaches the user depending on whether or not the user is in the wandering state.

The plurality of users may include a first user and a second user. The method may further comprise comparing learned movement information of the first user with learned movement information of the second user and grouping the first user and the second user into the same group if a result of the comparison is included in a predetermined range.

The movement information of the user may include at least one of a directionality of the user, a direction value of the user, a movement path of the user, a slope of a movement path of the user, or a movement speed of the user.

The determining whether or not the user is in the wandering state based on the learned movement information of the user may comprise extracting feature values from the movement information of the user, inputting the feature values to an artificial neural network (ANN) classifier to distinguish whether or not the user is in the wandering state, and determining whether or not the user is in the wandering state from an output of an artificial neural network.

The feature values may be values that are able to distinguish whether or not the user is in the wandering state.

Determining whether or not the intelligent robot device approaches the user may comprise controlling the intelligent robot device to approach the user or approach around the user if it is determined that the user is in the wandering state based on a result of learning.

The determining whether or not the user is in the wandering state based on the learned movement information of the user may comprise giving different weight values to the extracted feature values.

Downlink control information (DCI), that is used to schedule a transmission of the movement information of the user transmitted from a server, may be received from a network. The movement information of the user may be transmitted to the network based on the DCI.

An initial connection procedure may be performed with the network based on a synchronization signal block (SSB). The movement information of the user may be transmitted to the network via a PUSCH. DM-RSs of the SSB and the PUSCH may be quasi co-located (QCL) to a QCL type D.

A communication unit may be controlled to transmit the movement information of the user to an AI processor included in the network. The communication unit may be controlled to receive information that is AI-processed by the AI processor. The AI-processed information may be information that determines whether or not the user is in the wandering state.

The intelligent robot device may provide airport services to the user while moving in an airport.

Effects of a method of identifying a behavior direction recognition based service requester according to the present disclosure are described as follows.

The present disclosure can provide best airport services to airport users by learning movement information of the airport users, determining whether or not airport services are necessary based on a result of the learning, and first approaching an airport user which requires the airport services based on a result of the determination.

The present disclosure can improve the convenience of airport users by extracting an airport user which requires airport services and first approaching the airport user based on a result of the extraction.

The present disclosure can improve reliability of an intelligent robot system by controlling an intelligent robot device through AI processing.

Effects obtainable from the present disclosure are not limited by the effects mentioned above, and other effects which are not mentioned above can be clearly understood from the following description by those skilled in the art to which the present disclosure pertains.

BRIEF DESCRIPTION OF THE DRAWINGS

The accompanying drawings, which are included to provide a further understanding of the invention, illustrate embodiments of the invention and together with the description serve to explain the principle of the invention.

FIGS. 18A and 18B illustrate directionality of an airport user in accordance with an embodiment of the present disclosure.

FIG. 19 illustrates directionality of an airport user illustrated in FIGS. 18A and 18B using a slope of a movement path of the airport user.

FIGS. 20 and 21A and 21B illustrate a method of extracting a companion related to a wandering airport user in accordance with an embodiment of the present disclosure.

FIGS. 22A and 22B illustrate that directionality of an airport user is tracked and determined in accordance with an embodiment of the present disclosure.

FIGS. 23 to 25 illustrate that directionality and movement of an airport user are combined and determined in accordance with an embodiment of the present disclosure.

DETAILED DESCRIPTION OF THE EMBODIMENTS

Figure 1:
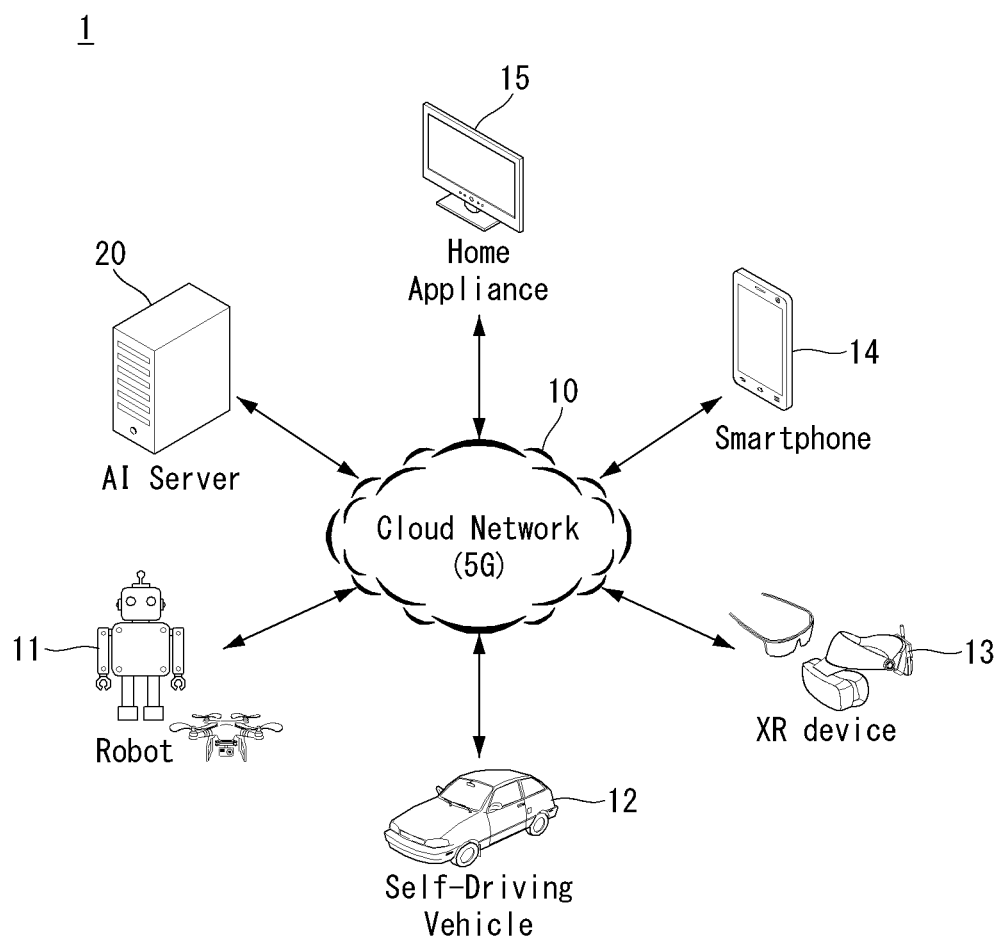
FIG. 1 illustrates one embodiment of an AI device.

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus may be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

[5G Scenario]

The three main requirement areas in the 5G system are (1) enhanced Mobile Broadband (eMBB) area, (2) massive Machine Type Communication (mMTC) area, and (3) Ultra-Reliable and Low Latency Communication (URLLC) area.

Some use case may require a plurality of areas for optimization, but other use case may focus only one Key Performance Indicator (KPI). The 5G system supports various use cases in a flexible and reliable manner.

eMBB far surpasses the basic mobile Internet access, supports various interactive works, and covers media and entertainment applications in the cloud computing or augmented reality environment. Data is one of core driving elements of the 5G system, which is so abundant that for the first time, the voice-only service may be disappeared. In the 5G, voice is expected to be handled simply by an application program using a data connection provided by the communication system. Primary causes of increased volume of traffic are increase of content size and increase of the number of applications requiring a high data transfer rate. Streaming service (audio and video), interactive video, and mobile Internet connection will be more heavily used as more and more devices are connected to the Internet. These application programs require always-on connectivity to push real-time information and notifications to the user. Cloud-based storage and applications are growing rapidly in the mobile communication platforms, which may be applied to both of business and entertainment uses. And the cloud-based storage is a special use case that drives growth of uplink data transfer rate. The 5G is also used for cloud-based remote works and requires a much shorter end-to-end latency to ensure excellent user experience when a tactile interface is used. Entertainment, for example, cloud-based game and video streaming, is another core element that strengthens the requirement for mobile broadband capability. Entertainment is essential for smartphones and tablets in any place including a high mobility environment such as a train, car, and plane. Another use case is augmented reality for entertainment and information search. Here, augmented reality requires very low latency and instantaneous data transfer.

Also, one of highly expected 5G use cases is the function that connects embedded sensors seamlessly in every possible area, namely the use case based on mMTC. Up to 2020, the number of potential IoT devices is expected to reach 20.4 billion. Industrial IoT is one of key areas where the 5G performs a primary role to maintain infrastructure for smart city, asset tracking, smart utility, agriculture and security.

URLLC includes new services which may transform industry through ultra-reliable/ultra-low latency links, such as remote control of major infrastructure and self-driving cars. The level of reliability and latency are essential for smart grid control, industry automation, robotics, and drone control and coordination.

Next, a plurality of use cases will be described in more detail.

The 5G may complement Fiber-To-The-Home (FTTH) and cable-based broadband (or DOCSIS) as a means to provide a stream estimated to occupy hundreds of megabits per second up to gigabits per second. This fast speed is required not only for virtual reality and augmented reality but also for transferring video with a resolution more than 4K (6K, 8K or more). VR and AR applications almost always include immersive sports games. Specific application programs may require a special network configuration. For example, in the case of VR game, to minimize latency, game service providers may have to integrate a core server with the edge network service of the network operator.

Automobiles are expected to be a new important driving force for the 5G system together with various use cases of mobile communication for vehicles. For example, entertainment for passengers requires high capacity and high mobile broadband at the same time. This is so because users continue to expect a high-quality connection irrespective of their location and moving speed. Another use case in the automotive field is an augmented reality dashboard. The augmented reality dashboard overlays information, which is a perception result of an object in the dark and contains distance to the object and object motion, on what is seen through the front window. In a future, a wireless module enables communication among vehicles, information exchange between a vehicle and supporting infrastructure, and information exchange among a vehicle and other connected devices (for example, devices carried by a pedestrian). A safety system guides alternative courses of driving so that a driver may drive his or her vehicle more safely and to reduce the risk of accident. The next step will be a remotely driven or self-driven vehicle. This step requires highly reliable and highly fast communication between different self-driving vehicles and between a self-driving vehicle and infrastructure. In the future, it is expected that a self-driving vehicle takes care of all of the driving activities while a human driver focuses on dealing with an abnormal driving situation that the self-driving vehicle is unable to recognize. Technical requirements of a self-driving vehicle demand ultra-low latency and ultra-fast reliability up to the level that traffic safety may not be reached by human drivers.

The smart city and smart home, which are regarded as essential to realize a smart society, will be embedded into a high-density wireless sensor network. Distributed networks comprising intelligent sensors may identify conditions for cost-efficient and energy-efficient conditions for maintaining cities and homes. A similar configuration may be applied for each home. Temperature sensors, window and heating controllers, anti-theft alarm devices, and home appliances will be all connected wirelessly. Many of these sensors typified with a low data transfer rate, low power, and low cost. However, for example, real-time HD video may require specific types of devices for the purpose of surveillance.

As consumption and distribution of energy including heat or gas is being highly distributed, automated control of a distributed sensor network is required. A smart grid collects information and interconnect sensors by using digital information and communication technologies so that the distributed sensor network operates according to the collected information. Since the information may include behaviors of energy suppliers and consumers, the smart grid may help improving distribution of fuels such as electricity in terms of efficiency, reliability, economics, production sustainability, and automation. The smart grid may be regarded as a different type of sensor network with a low latency.

The health-care sector has many application programs that may benefit from mobile communication. A communication system may support telemedicine providing a clinical care from a distance. Telemedicine may help reduce barriers to distance and improve access to medical services that are not readily available in remote rural areas. It may also be used to save lives in critical medical and emergency situations. A wireless sensor network based on mobile communication may provide remote monitoring and sensors for parameters such as the heart rate and blood pressure.

Wireless and mobile communication are becoming increasingly important for industrial applications. Cable wiring requires high installation and maintenance costs. Therefore, replacement of cables with reconfigurable wireless links is an attractive opportunity for many industrial applications. However, to exploit the opportunity, the wireless connection is required to function with a latency similar to that in the cable connection, to be reliable and of large capacity, and to be managed in a simple manner. Low latency and very low error probability are new requirements that lead to the introduction of the 5G system.

Logistics and freight tracking are important use cases of mobile communication, which require tracking of an inventory and packages from any place by using location-based information system. The use of logistics and freight tracking typically requires a low data rate but requires large-scale and reliable location information.

The present disclosure to be described below may be implemented by combining or modifying the respective embodiments to satisfy the aforementioned requirements of the 5G system.

FIG. 1 illustrates one embodiment of an AI device.

Referring to FIG. 1, in the AI system, at least one or more of an AI server 16, robot 11, self-driving vehicle 12, XR device 13, smartphone 14, or home appliance 15 are connected to a cloud network 10. Here, the robot 11, self-driving vehicle 12, XR device 13, smartphone 14, or home appliance 15 to which the AI technology has been applied may be referred to as an AI device (11 to 15).

The cloud network 10 may comprise part of the cloud computing infrastructure or refer to a network existing in the cloud computing infrastructure. Here, the cloud network 10 may be constructed by using the 3G network, 4G or Long Term Evolution (LTE) network, or 5G network.

In other words, individual devices (11 to 16) constituting the AI system may be connected to each other through the cloud network 10. In particular, each individual device (11 to 16) may communicate with each other through the eNB but may communicate directly to each other without relying on the eNB.

The AI server 16 may include a server performing AI processing and a server performing computations on big data.

The AI server 16 may be connected to at least one or more of the robot 11, self-driving vehicle 12, XR device 13, smartphone 14, or home appliance 15, which are AI devices constituting the AI system, through the cloud network 10 and may help at least part of AI processing conducted in the connected AI devices (11 to 15).

At this time, the AI server 16 may teach the artificial neural network according to a machine learning algorithm on behalf of the AI device (11 to 15), directly store the learning model, or transmit the learning model to the AI device (11 to 15).

At this time, the AI server 16 may receive input data from the AI device (11 to 15), infer a result value from the received input data by using the learning model, generate a response or control command based on the inferred result value, and transmit the generated response or control command to the AI device (11 to 15).

Similarly, the AI device (11 to 15) may infer a result value from the input data by employing the learning model directly and generate a response or control command based on the inferred result value.

<AI+Robot>

By employing the AI technology, the robot 11 may be implemented as a guide robot, transport robot, cleaning robot, wearable robot, entertainment robot, pet robot, or unmanned flying robot.

The robot 11 may include a robot control module for controlling its motion, where the robot control module may correspond to a software module or a chip which implements the software module in the form of a hardware device.

The robot 11 may obtain status information of the robot 11, detect (recognize) the surroundings and objects, generate map data, determine a travel path and navigation plan, determine a response to user interaction, or determine motion by using sensor information obtained from various types of sensors.

Here, the robot 11 may use sensor information obtained from at least one or more sensors among lidar, radar, and camera to determine a travel path and navigation plan.

The robot 11 may perform the operations above by using a learning model built on at least one or more artificial neural networks. For example, the robot 11 may recognize the surroundings and objects by using the learning model and determine its motion by using the recognized surroundings or object information. Here, the learning model may be the one trained by the robot 11 itself or trained by an external device such as the AI server 16.

At this time, the robot 11 may perform the operation by generating a result by employing the learning model directly but also perform the operation by transmitting sensor information to an external device such as the AI server 16 and receiving a result generated accordingly.

The robot 11 may determine a travel path and navigation plan by using at least one or more of object information detected from the map data and sensor information or object information obtained from an external device and navigate according to the determined travel path and navigation plan by controlling its locomotion platform.

Map data may include object identification information about various objects disposed in the space in which the robot 11 navigates. For example, the map data may include object identification information about static objects such as wall and doors and movable objects such as a flowerpot and a desk. And the object identification information may include the name, type, distance, location, and so on.

Also, the robot 11 may perform the operation or navigate the space by controlling its locomotion platform based on the control/interaction of the user. At this time, the robot 11 may obtain intention information of the interaction due to the user's motion or voice command and perform an operation by determining a response based on the obtained intention information.

<AI+Autonomous Navigation>

By employing the AI technology, the self-driving vehicle 12 may be implemented as a mobile robot, unmanned ground vehicle, or unmanned aerial vehicle.

The self-driving vehicle 12 may include an autonomous navigation module for controlling its autonomous navigation function, where the autonomous navigation control module may correspond to a software module or a chip which implements the software module in the form of a hardware device. The autonomous navigation control module may be installed inside the self-driving vehicle 12 as a constituting element thereof or may be installed outside the self-driving vehicle 12 as a separate hardware component.

The self-driving vehicle 12 may obtain status information of the self-driving vehicle 12, detect (recognize) the surroundings and objects, generate map data, determine a travel path and navigation plan, or determine motion by using sensor information obtained from various types of sensors.

Like the robot 11, the self-driving vehicle 12 may use sensor information obtained from at least one or more sensors among lidar, radar, and camera to determine a travel path and navigation plan.

In particular, the self-driving vehicle 12 may recognize an occluded area or an area extending over a predetermined distance or objects located across the area by collecting sensor information from external devices or receive recognized information directly from the external devices.

The self-driving vehicle 12 may perform the operations above by using a learning model built on at least one or more artificial neural networks. For example, the self-driving vehicle 12 may recognize the surroundings and objects by using the learning model and determine its navigation route by using the recognized surroundings or object information. Here, the learning model may be the one trained by the self-driving vehicle 12 itself or trained by an external device such as the AI server 16.

At this time, the self-driving vehicle 12 may perform the operation by generating a result by employing the learning model directly but also perform the operation by transmitting sensor information to an external device such as the AI server 16 and receiving a result generated accordingly.

The self-driving vehicle 12 may determine a travel path and navigation plan by using at least one or more of object information detected from the map data and sensor information or object information obtained from an external device and navigate according to the determined travel path and navigation plan by controlling its driving platform.

Map data may include object identification information about various objects disposed in the space (for example, road) in which the self-driving vehicle 12 navigates. For example, the map data may include object identification information about static objects such as streetlights, rocks and buildings and movable objects such as vehicles and pedestrians. And the object identification information may include the name, type, distance, location, and so on.

Also, the self-driving vehicle 12 may perform the operation or navigate the space by controlling its driving platform based on the control/interaction of the user. At this time, the self-driving vehicle 12 may obtain intention information of the interaction due to the user's motion or voice command and perform an operation by determining a response based on the obtained intention information.

<AI+XR>

By employing the AI technology, the XR device 13 may be implemented as a Head-Mounted Display (HMD), Head-Up Display (HUD) installed at the vehicle, TV, mobile phone, smartphone, computer, wearable device, home appliance, digital signage, vehicle, robot with a fixed platform, or mobile robot.

The XR device 13 may obtain information about the surroundings or physical objects by generating position and attribute data about 3D points by analyzing 3D point cloud or image data acquired from various sensors or external devices and output objects in the form of XR objects by rendering the objects for display.

The XR device 13 may perform the operations above by using a learning model built on at least one or more artificial neural networks. For example, the XR device 13 may recognize physical objects from 3D point cloud or image data by using the learning model and provide information corresponding to the recognized physical objects. Here, the learning model may be the one trained by the XR device 13 itself or trained by an external device such as the AI server 16.

At this time, the XR device 13 may perform the operation by generating a result by employing the learning model directly but also perform the operation by transmitting sensor information to an external device such as the AI server 16 and receiving a result generated accordingly.

<AI+Robot+Autonomous Navigation>

By employing the AI and autonomous navigation technologies, the robot 11 may be implemented as a guide robot, transport robot, cleaning robot, wearable robot, entertainment robot, pet robot, or unmanned flying robot.

The robot 11 employing the AI and autonomous navigation technologies may correspond to a robot itself having an autonomous navigation function or a robot 11 interacting with the self-driving vehicle 12.

The robot 11 having the autonomous navigation function may correspond collectively to the devices which may move autonomously along a given path without control of the user or which may move by determining its path autonomously.

The robot 11 and the self-driving vehicle 12 having the autonomous navigation function may use a common sensing method to determine one or more of the travel path or navigation plan. For example, the robot 11 and the self-driving vehicle 12 having the autonomous navigation function may determine one or more of the travel path or navigation plan by using the information sensed through lidar, radar, and camera.

The robot 11 interacting with the self-driving vehicle 12, which exists separately from the self-driving vehicle 12, may be associated with the autonomous navigation function inside or outside the self-driving vehicle 12 or perform an operation associated with the user riding the self-driving vehicle 12.

At this time, the robot 11 interacting with the self-driving vehicle 12 may obtain sensor information in place of the self-driving vehicle 12 and provide the sensed information to the self-driving vehicle 12; or may control or assist the autonomous navigation function of the self-driving vehicle 12 by obtaining sensor information, generating information of the surroundings or object information, and providing the generated information to the self-driving vehicle 12.

Also, the robot 11 interacting with the self-driving vehicle 12 may control the function of the self-driving vehicle 12 by monitoring the user riding the self-driving vehicle 12 or through interaction with the user. For example, if it is determined that the driver is drowsy, the robot 11 may activate the autonomous navigation function of the self-driving vehicle 12 or assist the control of the driving platform of the self-driving vehicle 12. Here, the function of the self-driving vehicle 12 controlled by the robot 12 may include not only the autonomous navigation function but also the navigation system installed inside the self-driving vehicle 12 or the function provided by the audio system of the self-driving vehicle 12.

Also, the robot 11 interacting with the self-driving vehicle 12 may provide information to the self-driving vehicle 12 or assist functions of the self-driving vehicle 12 from the outside of the self-driving vehicle 12. For example, the robot 11 may provide traffic information including traffic sign information to the self-driving vehicle 12 like a smart traffic light or may automatically connect an electric charger to the charging port by interacting with the self-driving vehicle 12 like an automatic electric charger of the electric vehicle.

<AI+Robot+XR>

By employing the AI technology, the robot 11 may be implemented as a guide robot, transport robot, cleaning robot, wearable robot, entertainment robot, pet robot, or unmanned flying robot.

The robot 11 employing the XR technology may correspond to a robot which acts as a control/interaction target in the XR image. In this case, the robot 11 may be distinguished from the XR device 13, both of which may operate in conjunction with each other.

If the robot 11, which acts as a control/interaction target in the XR image, obtains sensor information from the sensors including a camera, the robot 11 or XR device 13 may generate an XR image based on the sensor information, and the XR device 13 may output the generated XR image. And the robot 11 may operate based on the control signal received through the XR device 13 or based on the interaction with the user.

For example, the user may check the XR image corresponding to the viewpoint of the robot 11 associated remotely through an external device such as the XR device 13, modify the navigation path of the robot 11 through interaction, control the operation or navigation of the robot 11, or check the information of nearby objects.

<AI+Autonomous Navigation+XR>

By employing the AI and XR technologies, the self-driving vehicle 12 may be implemented as a mobile robot, unmanned ground vehicle, or unmanned aerial vehicle.

The self-driving vehicle 12 employing the XR technology may correspond to a self-driving vehicle having a means for providing XR images or a self-driving vehicle which acts as a control/interaction target in the XR image. In particular, the self-driving vehicle 12 which acts as a control/interaction target in the XR image may be distinguished from the XR device 13, both of which may operate in conjunction with each other.

The self-driving vehicle 12 having a means for providing XR images may obtain sensor information from sensors including a camera and output XR images generated based on the sensor information obtained. For example, by displaying an XR image through HUD, the self-driving vehicle 12 may provide XR images corresponding to physical objects or image objects to the passenger.

At this time, if an XR object is output on the HUD, at least part of the XR object may be output so as to be overlapped with the physical object at which the passenger gazes. On the other hand, if an XR object is output on a display installed inside the self-driving vehicle 12, at least part of the XR object may be output so as to be overlapped with an image object. For example, the self-driving vehicle 12 may output XR objects corresponding to the objects such as roads, other vehicles, traffic lights, traffic signs, bicycles, pedestrians, and buildings.

If the self-driving vehicle 12, which acts as a control/interaction target in the XR image, obtains sensor information from the sensors including a camera, the self-driving vehicle 12 or XR device 13 may generate an XR image based on the sensor information, and the XR device 13 may output the generated XR image. And the self-driving vehicle 12 may operate based on the control signal received through an external device such as the XR device 13 or based on the interaction with the user.

[Extended Reality Technology]

eXtended Reality (XR) refers to all of Virtual Reality (VR), Augmented Reality (AR), and Mixed Reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology may be applied to Head-Mounted Display (HMD), Head-Up Display (HUD), mobile phone, tablet PC, laptop computer, desktop computer, TV, digital signage, and so on, where a device employing the XR technology may be called an XR device.

Hereinafter, 5G communication (5th generation mobile communication) required by an apparatus requiring AI processed information and/or an AI processor will be described through paragraphs A through G.

A. Example of Block Diagram of UE and 5G Network

Figure 2:
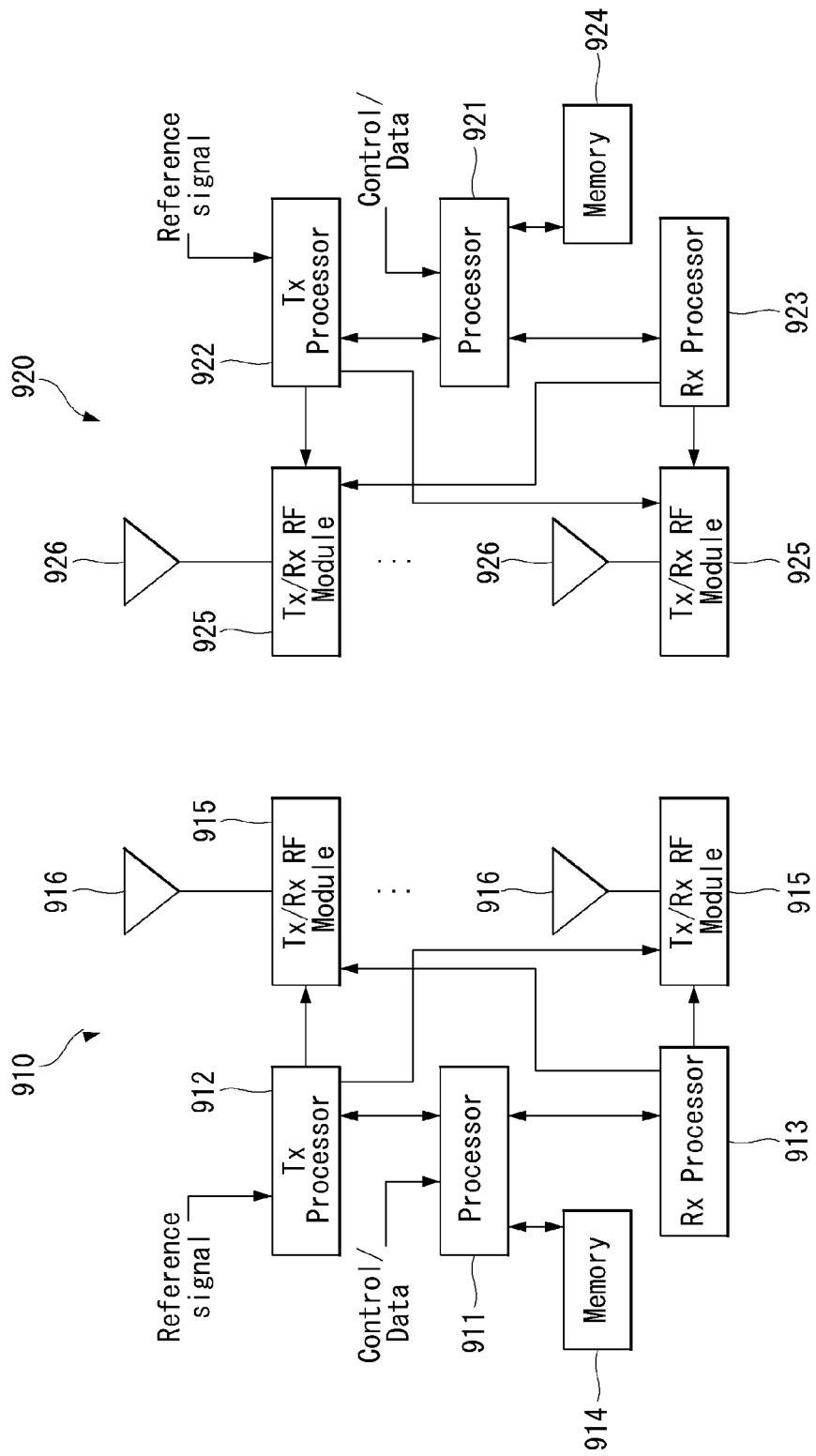
FIG. 2 is a block diagram of a wireless communication system to which methods proposed in the disclosure are applicable.

FIG. 2 is a block diagram of a wireless communication system to which methods proposed in the disclosure are applicable.

Referring to FIG. 2, a robot is defined as a first communication device 910, and a processor 911 can perform detailed operations of the robot.

A 5G network communicating with the robot is defined as a second communication device 920, and a processor 921 can perform detailed autonomous operations. Here, the 5G network may include another robot communicating with the robot.

The 5G network may be represented as the first communication device, and the robot may be represented as the second communication device.

For example, the first communication device or the second communication device may be a base station, a network node, a transmission terminal, a reception terminal, a wireless device, a wireless communication device, a robot, or the like.

For example, a terminal or user equipment (UE) may include a robot, a drone, a unmanned aerial vehicle (UAV), a cellular phone, a smart phone, a laptop computer, a digital broadcast terminal, a personal digital assistant (PDA), a portable multimedia player (PMP), a navigation device, a slate PC, a tablet PC, an ultrabook, a wearable device (e.g., a smart watch, a smart glass and a head mounted display (HMD)), etc. For example, the HIVID may be a display device worn on the head of a user. For example, the HIVID may be used to realize VR, AR or MR. Referring to FIG. 2, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 3:
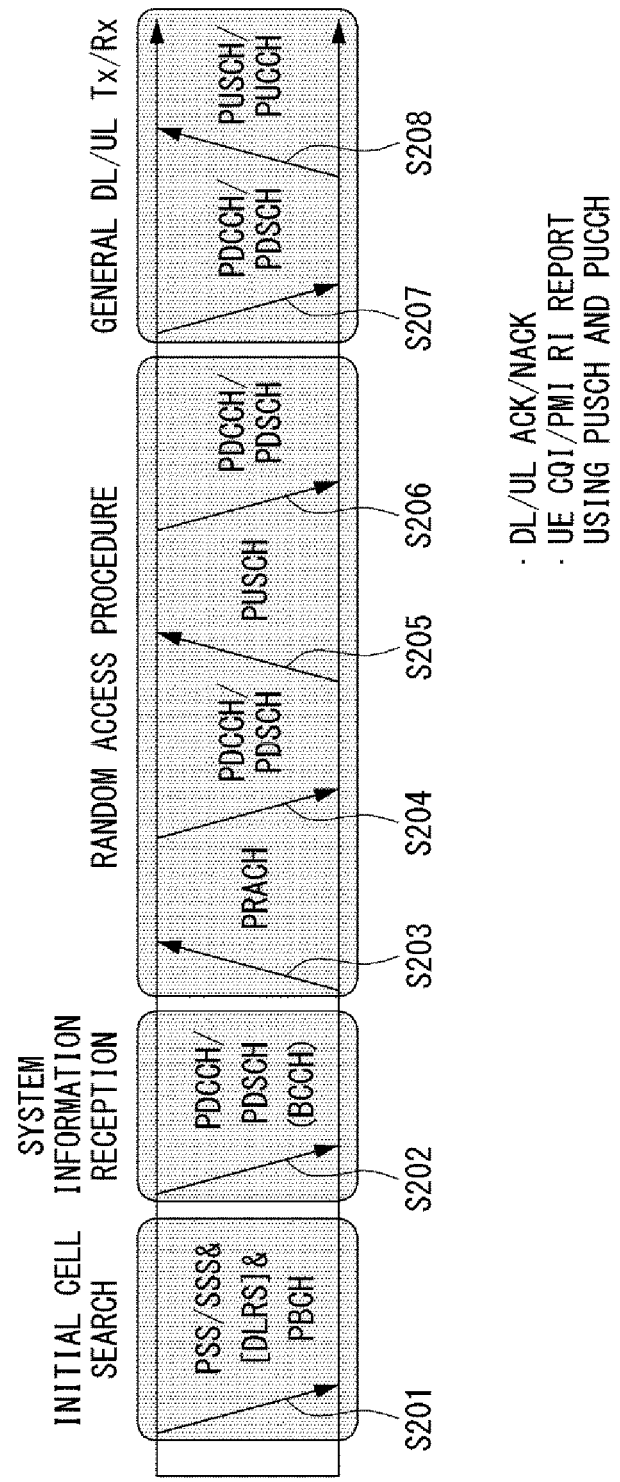
FIG. 3 shows an example of a signal transmission/reception method in a wireless communication system.

FIG. 3 is a diagram showing an example of a signal transmission/reception method in a wireless communication system.

Referring to FIG. 3, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 3.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 3.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping.

The UE calculates PRACH transmission power for preamble retransmission on the basis of most recent path loss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC CONNECTED.

- A UE receives a CSI-ResourceConfig IE including CSI-SSB-ResourceSetList for SSB resources used for BM from a BS. The RRC parameter "csi-SSB-Resource-SetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-S SB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to "beam management" from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
- When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3)

extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Robots Using 5G Communication

Figure 4:
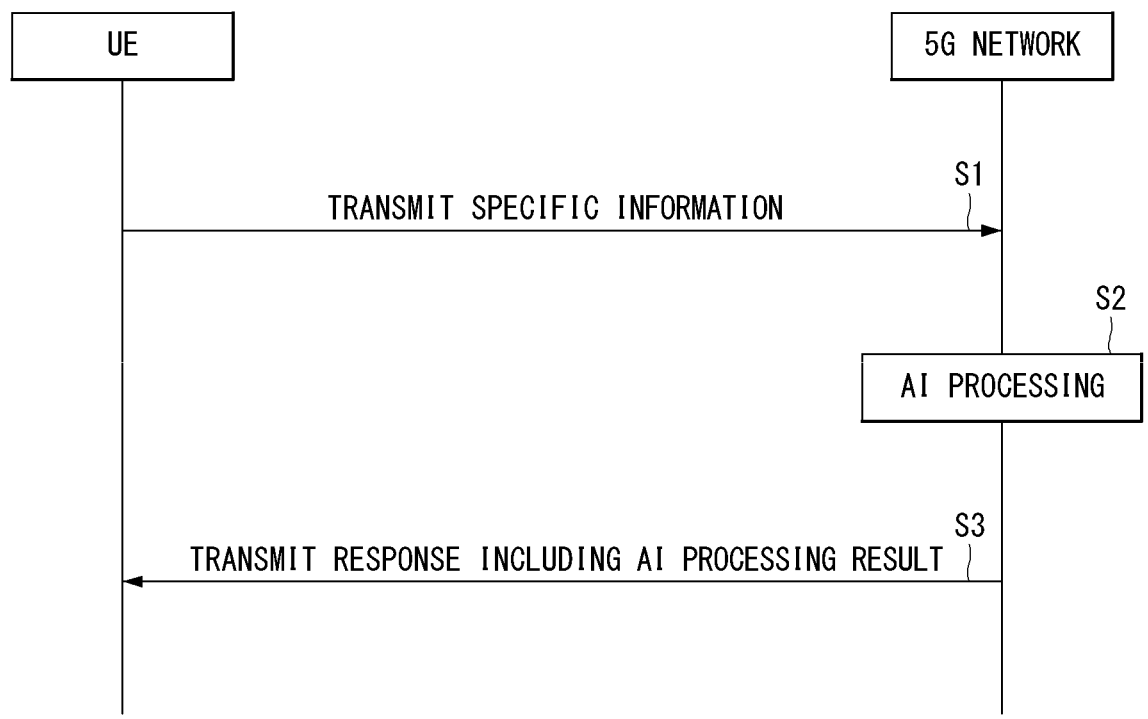
FIG. 4 shows an example of basic operations of an user equipment and a 5G network in a 5G communication system.

FIG. 4 shows an example of basic operations of a robot and a 5G network in a 5G communication system.

The robot transmits specific information to the 5G network (S1). The specific information may include autonomous driving related information. In addition, the 5G network can determine whether to remotely control the robot (S2). Here, the 5G network may include a server or a module which performs remote control related to autonomous driving. In addition, the 5G network can transmit information (or signal) related to remote control to the robot (S3).

G. Applied Operations Between Autonomous Robot and 5G Network in 5G Communication System Hereinafter, the operation of a robot using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 4, the robot performs an initial access procedure and a random access procedure with the 5G network prior to step S1 of FIG. 4 in order to transmit/receive signals, information and the like to/from the 5G network.

More specifically, the robot performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the robot receives a signal from the 5G network.

In addition, the robot performs a random access procedure with the 5G network for UL synchronization acquisition and/or UL transmission. The 5G network can transmit, to the robot, a UL grant for scheduling transmission of specific information. Accordingly, the robot transmits the specific information to the 5G network on the basis of the UL grant. In addition, the 5G network transmits, to the robot, a DL grant for scheduling transmission of 5G processing results with respect to the specific information. Accordingly, the 5G network can transmit, to the robot, information (or a signal) related to remote control on the basis of the DL grant.

Next, a basic procedure of an applied operation to which a method proposed by the present disclosure which will be described later and URLLC of 5G communication are applied will be described.

As described above, a robot can receive DownlinkPreemption IE from the 5G network after the robot performs an initial access procedure and/or a random access procedure with the 5G network. Then, the robot receives DCI format 2_1 including a preemption indication from the 5G network on the basis of DownlinkPreemption IE. The robot does not perform (or expect or assume) reception of eMBB data in resources (PRBs and/or OFDM symbols) indicated by the preemption indication. Thereafter, when the robot needs to transmit specific information, the robot can receive a UL grant from the 5G network.

Next, a basic procedure of an applied operation to which a method proposed by the present disclosure which will be described later and mMTC of 5G communication are applied will be described.

Description will focus on parts in the steps of FIG. 4 which are changed according to application of mMTC.

In step S1 of FIG. 4, the robot receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the robot transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

H. Autonomous Driving Operation Between Robots Using 5G Communication

Figure 5:
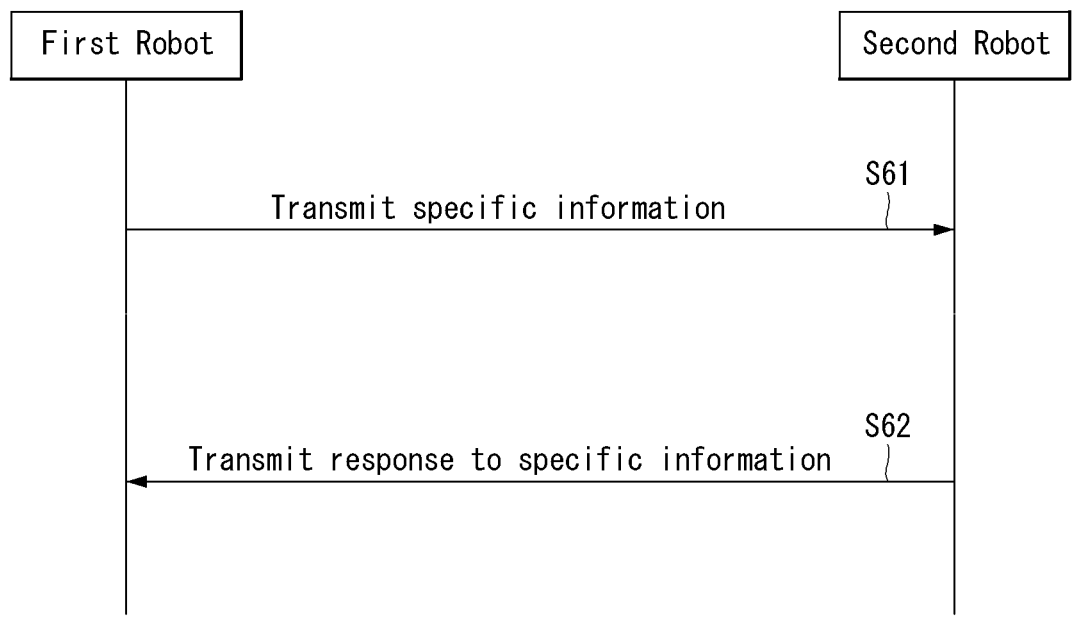
FIG. 5 illustrates an example of a basic operation of robot-to-robot using 5G communication.

FIG. 5 shows an example of a basic operation between robots using 5G communication.

A first robot transmits specific information to a second robot (S61). The second robot transmits a response to the specific information to the first robot (S62).

Meanwhile, a configuration of an applied operation between robots may depend on whether the 5G network is directly (sidelink communication transmission mode 3) or indirectly (sidelink communication transmission mode 4) involved in resource allocation for the specific information and the response to the specific information.

Next, an applied operation between robots using 5G communication will be described.

First, a method in which a 5G network is directly involved in resource allocation for signal transmission/reception between robots will be described.

The 5G network can transmit DCI format 5A to the first robot for scheduling of mode-3 transmission (PSCCH and/or PSSCH transmission). Here, a physical sidelink control channel (PSCCH) is a 5G physical channel for scheduling of transmission of specific information a physical sidelink shared channel (PSSCH) is a 5G physical channel for transmission of specific information. In addition, the first robot transmits SCI format 1 for scheduling of specific information transmission to the second robot over a PSCCH. Then, the first robot transmits the specific information to the second robot over a PSSCH.

Next, a method in which a 5G network is indirectly involved in resource allocation for signal transmission/reception will be described.

The first robot senses resources for mode-4 transmission in a first window. Then, the first robot selects resources for mode-4 transmission in a second window on the basis of the sensing result. Here, the first window refers to a sensing window and the second window refers to a selection window. The first robot transmits SCI format 1 for scheduling of transmission of specific information to the second robot over a PSCCH on the basis of the selected resources. Then, the first robot transmits the specific information to the second robot over a PSSCH.

The above-described 5G communication technology can be combined with methods proposed in the present disclosure which will be described later and applied or can complement the methods proposed in the present disclosure to make technical features of the methods concrete and clear.

Figure 6:
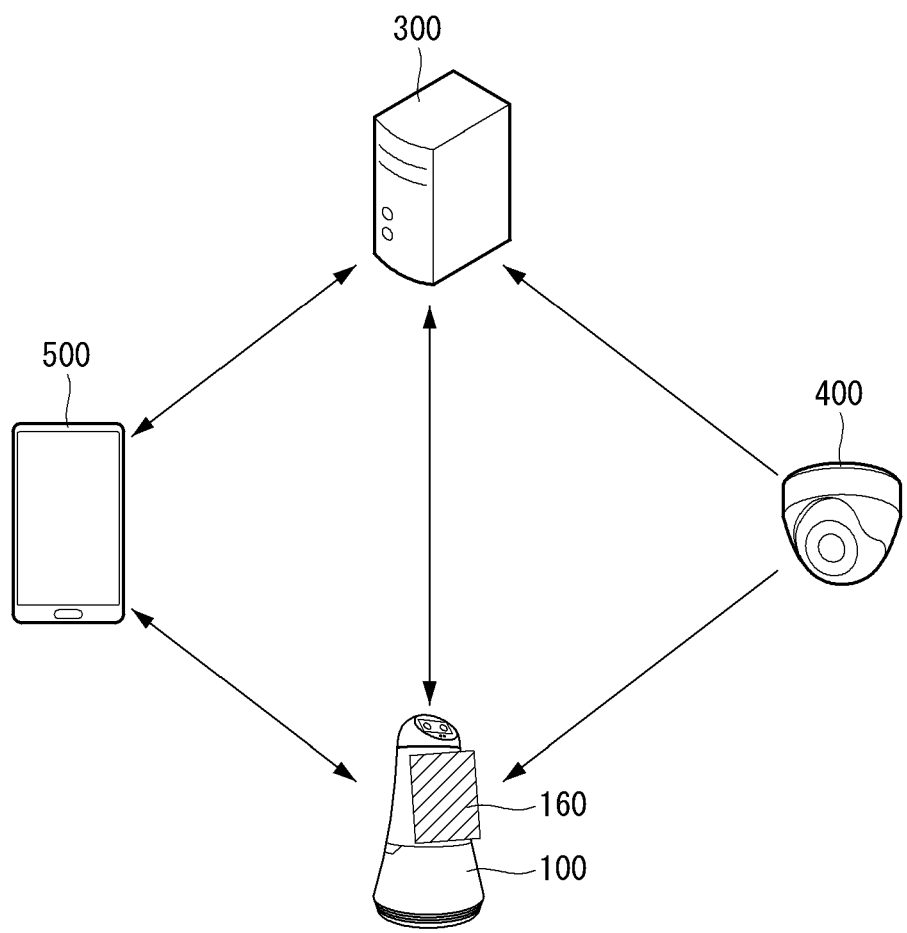
FIG. 6 illustrates a control system controlling an intelligent robot device according to an embodiment of the present disclosure.

FIG. 6 illustrates a control system controlling an intelligent robot device according to an embodiment of the present disclosure.

Referring to FIG. 6, a control system controlling an intelligent robot device according to an embodiment of the present disclosure may include an intelligent robot device 100, a server 300, a camera 400, and a mobile terminal 500.

The intelligent robot device 100 may serve as patrol, guide, cleaning, disinfect, transport, and the like in the airport. For example, the intelligent robot device 100 may travel around or indoors the general exhibition hall, museum, exhibition, airport, etc., and may provide various information to customers or airport users.

The intelligent robot device 100 may transmit and receive signals to and from the server 300 or the mobile terminal 500. For example, the intelligent robot device 100 may transmit and receive a signal including information on a situation in the airport to and from the server 300.

The intelligent robot device 100 may receive, from the camera 400 of the airport, image information of respective zones of the airport taken with the camera 400. Thus, the intelligent robot device 100 may monitor the situation of the airport by combining image information taken by the intelligent robot device 100 and image information received from the camera 400.

The intelligent robot device 100 may receive a command directly from the airport user. For example, the intelligent robot device 100 may receive a command directly from the airport user through an input of touching a display 160 included in the intelligent robot device 100 or a voice input, etc.

The intelligent robot device 100 may perform an operation such as patrol, guide, and cleaning according to commands received from the airport user, the server 300, or the mobile terminal 500, etc.

The server 300 may receive information from the intelligent robot device 100, the camera 400, and/or the mobile terminal 500. The server 300 may combine, store, and manage information received from the respective components. The server 300 may transmit the stored information to the intelligent robot device 100 or the mobile terminal 500. The server 300 may send a command signal for each of a plurality of intelligent robot devices 100 disposed in the airport.

The server 300 may transmit, to the intelligent robot device 100, airport-related data such as airport maps and mapping data including information about objects disposed in the airport or person moving in the airport.

The camera 400 may include cameras installed in the airport. For example, the camera 400 may include all of a plurality of closed circuit television (CCTV) cameras installed in the airport, an infrared thermal sensor camera, and the like. The camera 400 may sends images taken with the camera 400 to the server 300 or the intelligent robot device 100. The image taken with the camera 400 may be referred to as an airport image.

The mobile terminal 500 may transmit and receive data to and from the server 300 or the intelligent robot device 100 in the airport. For example, the mobile terminal 500 may receive airport-related data, such as flight time schedule, airport map, etc., from the intelligent robot device 100 or the server 300. The airport user may receive and obtain information required in the airport from the intelligent robot device 100 or the server 300 through the mobile terminal 500. The mobile terminal 500 may transmit data, such as photographs, video, message, etc., to the intelligent robot device 100 or the server 300. For example, the airport user may send a picture of a missing child to the intelligent robot device 100 or the server 300 to report the missing child, or may request the cleaning of the corresponding zone by taking a picture of the zone requiring the cleaning in the airport and transmitting the picture to the server 300.

The mobile terminal 500 may transmit, to the intelligent robot device 100, a signal for calling the intelligent robot device 100, a signal for instructing to perform a specific operation, an information request signal, or the like. The intelligent robot device 100 may move to a location of the mobile terminal 500 in response to a call signal received from the mobile terminal 500 or perform an operation corresponding to a command signal.

Alternatively, the intelligent robot device 100 may transmit data corresponding to the information request signal to the mobile terminal 500 of each airport user.

Figure 7:
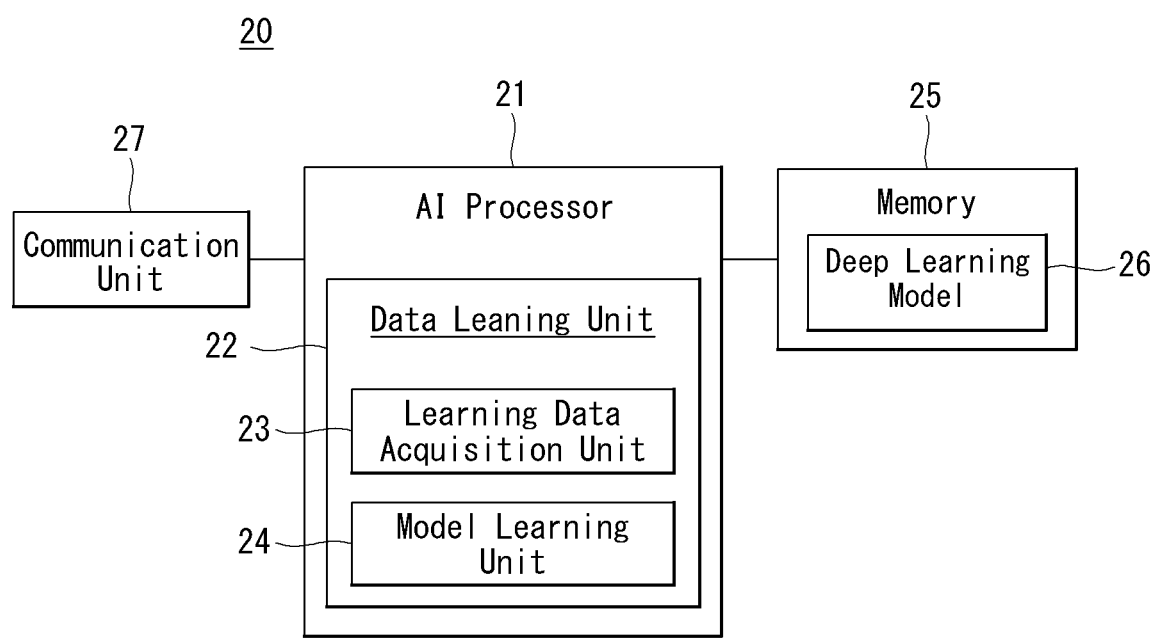
FIG. 7 is a block diagram of an AI device according to an embodiment of the present disclosure.

FIG. 7 is a block diagram of an AI device according to an embodiment of the present disclosure.

An AI device 20 may include an electronic device including an AI module capable of performing AI processing, or a server including the AI module, or the like. Further, the AI device 20 may be included as at least some components of the intelligent robot device 100 illustrated in FIG. 6 and perform together at least a part of the AI processing.

The AI processing may include all operations related to driving of the intelligent robot device 100 illustrated in FIG. 6. For example, the intelligent robot device 100 can perform AI processing on image signals or sensing data to perform processing/decision operation and a control signal generation operation. For example, the intelligent robot device 100 can perform AI processing on data acquired through interaction with other electronic devices (e.g., the server 300 (see FIG. 6), the mobile terminal 500 (see FIG. 6), the second intelligent robot device (see FIG. 6)) included in the airport to perform the control of driving.

The AI device 20 may include an AI processor 21, a memory 25, and/or a communication unit 27.

The AI device 20 is a computing device capable of learning a neutral network and may be implemented as various electronic devices including a server, a desktop PC, a notebook PC, a tablet PC, and the like.

The AI processor 21 may learn a neural network using a program stored in the memory 25. In particular, the AI processor 21 may learn a neural network for recognizing robot related data. Here, the neural network for recognizing the robot related data may be designed to emulate a human brain structure on a computer and may include a plurality of network nodes with weight that emulate neurons in a human neural network. The plurality of network nodes may send and receive data according to each connection relationship so that neurons emulate the synaptic activity of neurons sending and receiving signals through synapses. Here, the neural network may include a deep learning model, which has evolved from a neural network model. In the deep learning model, the plurality of network nodes may be arranged in different layers and may send and receive data according to a convolution connection relationship. Examples of the neural network model may include various deep learning techniques, such as deep neural networks (DNN), convolutional deep neural networks (CNN), recurrent Boltzmann machine (RNN), restricted Boltzmann machine (RBM), deep belief networks (DBN), and deep Q-networks, and are applicable to fields including computer vision, voice recognition, natural language processing, and voice/signal processing, etc.

A processor performing the above-described functions may be a general purpose processor (e.g., CPU), but may be AI-dedicated processor (e.g., GPU) for AI learning.

The memory 25 may store various programs and data required for the operation of the AI device 20. The memory 25 may be implemented as a non-volatile memory, a volatile memory, a flash memory, a hard disk drive (HDD), or a solid state drive (SSD), etc. The memory 25 may be accessed by the AI processor 21, and the AI processor 21 may read/write/modify/delete/update data. Further, the memory 25 may store a neural network model (e.g., deep learning model 26) created by a learning algorithm for data classification/recognition according to an embodiment of the present disclosure.

The AI processor 21 may further include a data learning unit 22 for learning a neural network for data classification/recognition. The data learning unit 22 may learn criteria as to which learning data is used to decide the data classification/recognition and how data is classified and recognized using learning data. The data learning unit 22 may learn a deep learning model by acquiring learning data to be used in learning and applying the acquired learning data to the deep learning model.

The data learning unit 22 may be manufactured in the form of at least one hardware chip and mounted on the AI device 20. For example, the data learning unit 22 may be manufactured in the form of a dedicated hardware chip for artificial intelligence (AI), or may be manufactured as a part of a general purpose processor (e.g., CPU) or a graphic-dedicated processor (e.g., GPU) and mounted on the AI device 20. Further, the data learning unit 22 may be implemented as a software module. If the data learning unit 22 is implemented as the software module (or a program module including instruction), the software module may be stored in non-transitory computer readable media. In this case, at least one software module may be provided by an operating system (OS), or provided by an application.

The data learning unit 22 may include a learning data acquisition unit 23 and a model learning unit 24.

The learning data acquisition unit 23 may acquire learning data required for a neural network model for classifying and recognizing data. For example, the learning data acquisition unit 23 may acquire, as learning data, vehicle data and/or sample data to be input to a neural network model.

By using the acquired learning data, the model learning unit 24 may learn so that the neural network model has a criteria for determining how to classify predetermined data. In this instance, the model learning unit 24 may train the neural network model through supervised learning which uses at least a part of the learning data as the criteria for determination. Alternatively, the model learning unit 24 may train the neural network model through unsupervised learning which finds criteria for determination by allowing the neural network model to learn on its own using the learning data without supervision. Further, the model learning unit 24 may train the neural network model through reinforcement learning using feedback about whether a right decision is made on a situation by learning. Further, the model learning unit 24 may train the neural network model using a learning algorithm including error back-propagation or gradient descent.

If the neural network model is trained, the model learning unit 24 may store the trained neural network model in the memory. The model learning unit 24 may store the trained neural network model in a memory of a server connected to the AI device 20 over a wired or wireless network.

The data learning unit 22 may further include a learning data pre-processing unit (not shown) and a learning data selection unit (not shown), in order to improve a result of analysis of a recognition model or save resources or time required to create the recognition model.

The learning data pre-processing unit may pre-process obtained data so that the obtained data can be used in learning for deciding the situation. For example, the learning data pre-processing unit may process obtained learning data into a predetermined format so that the model learning unit 24 can use the obtained learning data in learning for recognizing images.

Moreover, the learning data selection unit may select data required for learning among learning data obtained by the learning data acquisition unit 23 or learning data pre-processed by the pre-processing unit. The selected learning data may be provided to the model learning unit 24. For example, the learning data selection unit may detect a specific area in an image obtained with a camera of a robot to select only data for objects included in the specific area as learning data.

In addition, the data learning unit 22 may further include a model evaluation unit (not shown) for improving the result of analysis of the neural network model.

The model evaluation unit may input evaluation data to the neural network model and may allow the model learning unit 22 to learn the neural network model again if a result of analysis output from the evaluation data does not satisfy a predetermined criterion. In this case, the evaluation data may be data that is pre-defined for evaluating the recognition model. For example, if the number or a proportion of evaluation data with inaccurate analysis result among analysis results of the recognition model learned on the evaluation data exceeds a predetermined threshold, the model evaluation unit may evaluate the analysis result as not satisfying the predetermined criterion.

The communication unit 27 may transmit, to an external electronic device, a result of the AI processing by the AI processor 21.

Here, the external electronic device may be defined as an intelligent robot device. Further, the AI device 20 may be defined as another intelligent robot device or a 5G network that communicates with the intelligent robot device. The AI device 20 may be implemented by being functionally embedded into various modules included in the intelligent robot device. The 5G network may include a server or a module that performs the control related to the robot.

Although the AI device 20 illustrated in FIG. 7 was functionally separately described into the AI processor 21, the memory 25, the communication unit 27, etc., the above components may be integrated into one module and referred to as an AI module.

Figure 8:
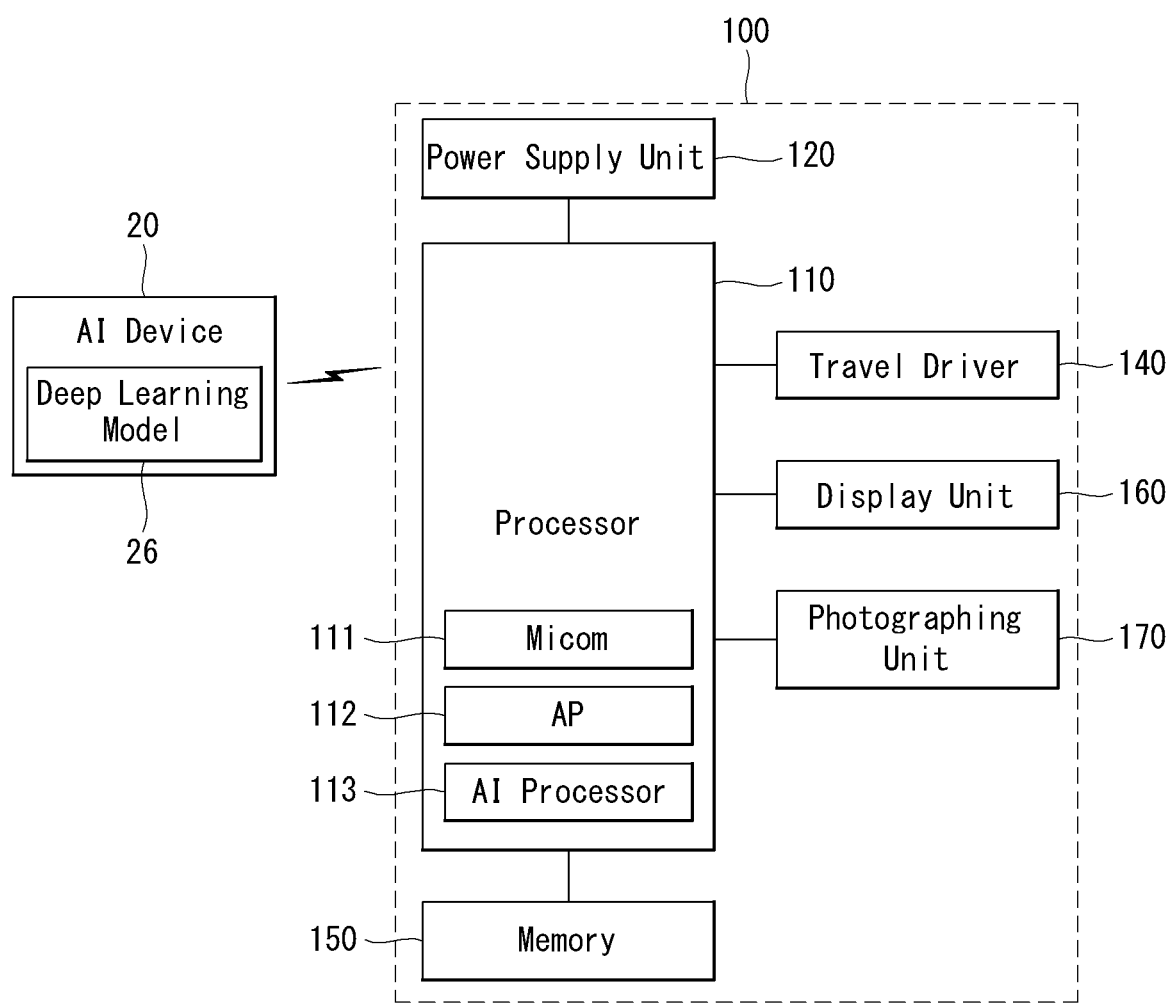
FIG. 8 illustrates a system associated with an AI device and an intelligent robot device according to an embodiment of the present disclosure.

FIG. 8 illustrates a system associated with an AI device and an intelligent robot device according to an embodiment of the present disclosure.

Referring to FIG. 8, an intelligent robot device 100 may transmit data requiring AI processing to an AI device 20 through a communication unit, and the AI device 20 including a deep learning model 26 may transmit a result of AI processing using the deep learning model 26 to the intelligent robot device 100. The AI device 20 may refer to the description described above with reference to FIG. 7.

The intelligent robot device 100 may include a memory 150, a processor 110, and a power supply unit 120. The processor 110 may include a Micom 111 and an application processor (AP) 112 and may further include an AI processor 113.

The intelligent robot device 100 may include an interface unit that is wiredly or wirelessly connected to at least one electronic device included in the intelligent robot device 100 and can exchange data necessary for the travel control. At least one electronic device connected through the interface unit may include a travel driver 140, a display unit 160, a photographing unit 170, a communication unit 190, and the like. The interface unit may consist of at least one of a communication module, a terminal, a pin, a cable, a port, a circuit, an element, or a device.

The memory 150 is electrically connected to the processor 110. The memory 150 may store basic data for a unit, control data for operation control of the unit, and input/output data. The memory 150 may store data processed in the processor 110. The memory 150 may consist of at least one of a ROM, RAM, EPROM, flash drive, or hard drive in hardware. The memory 150 may store a variety of data for overall operation of the intelligent robot device 100, such as a program for the processing or control of the processor 110. The memory 150 may be integrally implemented with the processor 110. In some embodiments, the memory 150 may be classified into a sub-component of the processor 110.

The power supply unit 120 may supply power to the intelligent robot device 100. The power supply unit 120 may receive power from a power source (e.g., battery) included in the intelligent robot device 100 and supply power to each unit of the intelligent robot device 100. The power supply unit 120 may operate in response to a control signal provided by main ECU. The power supply unit 120 may include a switched-mode power supply (SMPS).

The processor 110 may be electrically connected to the memory 150, the interface unit (not shown), and the power supply unit 120 and may exchange signals with them. The processor 110 may be referred to as a controller 110. The processor 110 may be implemented using at least one of ASICs (application specific integrated circuits), DSPs (digital signal processors), DSPDs (digital signal processing devices), PLDs (programmable logic devices), FPGAs (field programmable gate arrays), controllers, micro-controllers, or electrical units for performing other functions.

The processor 110 may be driven by power provided by the power supply unit 120. The processor 110 may receive data in a state where power is provided by the power supply unit 120, process data, generate a signal, and provide the signal.

The processor 110 may receive information from other electronic device included in the intelligent robot device 100 through the interface unit. The processor 110 may provide a control signal to other electronic device included in the intelligent robot device 100 through the interface unit.

The intelligent robot device 100 may include at least one printed circuit board (PCB). The memory 150, the interface unit, the power supply unit 120, and the processor 110 may be electrically connected on the printed circuit board.

Other electronic device included in the intelligent robot device 100 connected to the interface unit, the Micom 111, the AP 112, and the AI processor 113 are described in more detail below. Hereinafter, the intelligent robot device 100 is referred to as a robot 100 for convenience of explanation.

The intelligent robot device 100 may include a body 101 with a predetermined shape. The body 101 may have any shape as long as it can protect the components disposed therein from foreign substances or obstacles generated from the outside.

The intelligent robot device 100 may include the communication unit 190, the photographing unit 170, the controller 110, the display unit 160, and the travel driver 140.

The communication unit 190 may be embedded in the body 101. The communication unit 190 may receive images taken with a plurality of cameras disposed in the airport and receive mapping data for obstacles located in the airport and movement path data or movement prediction data for the airport user. The communication unit 190 may include a 5G router 162 (see FIG. 9). The communication unit 190 may receive mapping data, movement path data, and movement prediction data using 5G communication or 5G network. The obstacle may include the airport user or the customer moving in the airport, or an object placed at the airport, or the like.

An image taken with the plurality of cameras disposed in the airport may be referred to as an airport image.

The photographing unit 170 may be disposed at the body 101 and may take an image of the obstacle on or around the path of the intelligent robot device 100. The photographing unit 170 may include at least one camera. The at least one camera may be referred to as a robot camera. The robot camera may take in real time an image of surroundings of the intelligent robot device 100 that is travelling or moving. An image taken with the robot camera may be referred to as a patrol image, a moving image, a robot image.

The processor 110 may receive movement information of the airport user from the communication unit 190, learn the movement information of the airport user, recognize a wandering state of the airport user based on the learned movement information of the airport user, and control the airport user to move based on a result of the recognition.

The processor 110 may extract feature values from the movement information of the airport user received from the communication unit 190, input the feature values to an artificial neural network (ANN) classifier to distinguish whether or not the airport user is in the wandering state, and determine the wandering state of the airport user from an output of the artificial neural network.

The processor 110 may give different weight values to the extracted feature values. The processor 110 may determine a priority of the feature values based on the given weight values, and control the movement of one or more intelligent robot devices of a plurality of intelligent robot devices based on the determined priority.

The travel driver 140 may be positioned on the lower side of the body 101 and may move toward a target location under the control of the processor 110. The travel driver 140 will be described in detail later. The travel driver 140 may move in the airport based on the mapping data, the movement path data, and the movement prediction data provided by the communication unit 190 and the robot image provided by the photographing unit 170 under the control of the processor 110.

The display unit 160 may be disposed in front or on a front surface of the body 101 and may display information on airport services. For example, the display unit 160 may display execution screen information of an application program run by the intelligent robot device 100 or information on a user interface (UI) and a graphic user interface (GUI) according to the execution screen information.

The display unit 160 may include at least one of a liquid crystal display (LCD), a thin film transistor liquid crystal display (TFT LCD), an organic light emitting diode (OLED) display, a flexible display, a three-dimensional (3D) display, and an electronic ink (e-ink) display.

Two or more display units 160 may exist according to a shape of the intelligent robot device 100. In this case, in the intelligent robot device 100, the plurality of display units 160 may be disposed in front (or the front surface) or in rear (or the rear surface).

The display unit 160 may include a touch sensor. The display unit 160 may receive a control command using the touch sensor. For example, if a touch of the display unit 160 is sensed, the touch sensor may generate a control command or a command signal corresponding to the touch under the control of the processor 110. The contents input by the touch method may include information about the airport services, an airport service menu item, and the like.

The display unit 160 may form a touch screen or a touch monitor with the touch sensor. In this case, the touch screen may serve as a user interface. The display unit 160 may be referred to as a user interface.

The intelligent robot device 100 may transmit data obtained through the at least one sensor to the AI device 20 through the communication unit 190, and the AI device 20 may transmit, to the intelligent robot device 100, AI processing data generated by applying the neural network model 26 to the transmitted data. The intelligent robot device 100 may recognize information about a movement path and a movement prediction path that are detected based on the received AI processing data, and the processor 110 may perform a travel control operation using the recognized information.

The communication unit 190 may exchange signals with a device positioned outside the intelligent robot device 100. The communication unit 190 may exchange signals with at least one of an infrastructure (e.g., a server or a broadcasting station), another intelligent robot device 100, or a terminal. The communication unit 190 may include at least one of a transmit antenna, a receive antenna, a radio frequency (RF) circuit capable of implementing various communication protocols, and an RF element, in order to perform communication.

By applying the neural network model to movement path data and/or movement prediction data of the airport user provided through the communication unit 190, at least one of information on a moving direction of the airport user, movement path information, or movement prediction information may be generated.

The AI processor 113 may generate a signal for controlling the movement of the intelligent robot device 100 according to a driving plan created by the processor 110 in a travel mode.

The intelligent robot device 100 may transmit data necessary for the travel control to the AI device 20 through the communication unit 190, and the AI device 20 may transmit, to the intelligent robot device 100, AI processing data generated by applying the neural network model to the transmitted data. The intelligent robot device 100 may use the received AI processing data to control the movement of the intelligent robot device 100 in the airport.

The travel driver 140 may include at least one electronic control device (e.g., control electronic control unit (ECU)).

The travel driver 140 may control a power train, a steering device, and a brake device based on the signal received by the processor 110. The signal received by the processor 110 may be a travel control signal generated by applying the neural network model to data related to the intelligent robot device 100 in the AI processor 113. The travel control signal may be a signal received from the AI device 20 positioned outside through the communication unit 190.

A sensing unit 300 may sense a state of the intelligent robot device 100. The sensing unit 300 may include at least one of an inertial measurement unit (IMU) sensor, a collision sensor, a wheel sensor, a speed sensor, a tilt sensor, a weight sensor, a heading sensor, a gyro sensor, a position module, a robot forward/reverse sensor, a battery sensor, a tire sensor, a steering sensor, a temperature sensor, a humidity sensor, an ultrasonic sensor, or an illumination sensor. The IMU sensor may include one or more of an acceleration sensor, a gyro sensor, and a magnetic sensor.

The sensing unit 130 may be referred to as an obstacle recognition unit.

The AI processor 113 may generate state data of the intelligent robot device 100 by applying the neural network model to sensing data generated in at least one sensor. The AI processing data generated by applying the neural network model may include robot motion data, robot yaw data, robot roll data, robot pitch data, robot collusion data, robot direction data, robot angle data, robot speed data, robot acceleration data, robot tilt data, robot forward/reverse data, robot weight data, battery data, tire air pressure data, robot internal temperature data, robot internal humidity data, steering wheel rotation angle data, robot external illuminance data, acceleration data, brake data, and the like.

The processor 110 may generate a travel control signal based on the AI-processed state data of the robot.

The intelligent robot device 100 may transmit the sensing data obtained through the at least one sensor to the AI device 20 through the communication unit 190, and the AI device 20 may transmit, to the intelligent robot device 100, AI processing data generated by applying the neural network model 26 to the transmitted data.

A location sensing unit 180 may generate location data of the intelligent robot device 100. The location sensing unit 180 may be referred to as a location recognition unit. The location recognition unit 180 may include at least one of a global positioning system (GPS) and a differential global positioning system (DGPS).

The AI processor 113 may generate more accurate location data of the robot by applying the neural network model to location data generated by at least one location recognition unit 180.

According to an embodiment of the present disclosure, the AI processor 113 may perform deep learning calculation based on at least one of an inertial measurement unit (IMU) of the sensing unit 130 and a camera image, and correct location data based on the generated AI processing data.

The intelligent robot device 100 may transmit the location data obtained from the location recognition unit 180 to the AI device 20 through the communication unit 190, and the AI device 20 may transmit, to the intelligent robot device 100, AI processing data generated by applying the neural network model 26 to the transmitted location data.

The intelligent robot device 100 may include an internal communication system (not shown). A plurality of electronic devices included in the intelligent robot device 100 may exchange signals by the medium of the internal communication system. Data may be included in the signals. The internal communication system (not shown) may use at least one communication protocol (e.g., CAN, LIN, FlexRay, MOST, Ethernet, etc.).

The processor 110 may create a path for travel based on obtained data and create a driving plan for travel along the created path.

The processor 110 may implement at least one of an autonomous emergency braking (AEB) system, a forward collision warning (FCW) system, a target following assist (TFA) system, a blind spot detection (BSD) system, an auto parking system (APS), a PD collision warning system, a night vision (NV) system, a client status monitoring (CSM) system, and a client jam assist (CJA) system.

The AI processor 113 may forward, to the processor 110, a control signal capable of performing at least one of functions of the above-described systems by applying the neural network model to airport user related information received from at least one sensor included in the intelligent robot device 100 and an external device, and information received from another intelligent robot device 100 communicating with the intelligent robot device 100.

The intelligent robot device 100 may transmit at least one data for performing the functions of the various systems to the AI device 20 through the communication unit 190. The AI device 20 may forward, to the intelligent robot device 100, a control signal capable of performing the functions of the various systems by applying the neural network model 26 to the received data.

So far, the embodiments of the present disclosure have described that 5G communication required to implement the robot control method and the AI processing applying the 5G communication are performed, and a result of the AI processing are transmitted and received.

Detailed configuration of the intelligent robot device according to an embodiment of the present disclosure is described below.

Figure 9:
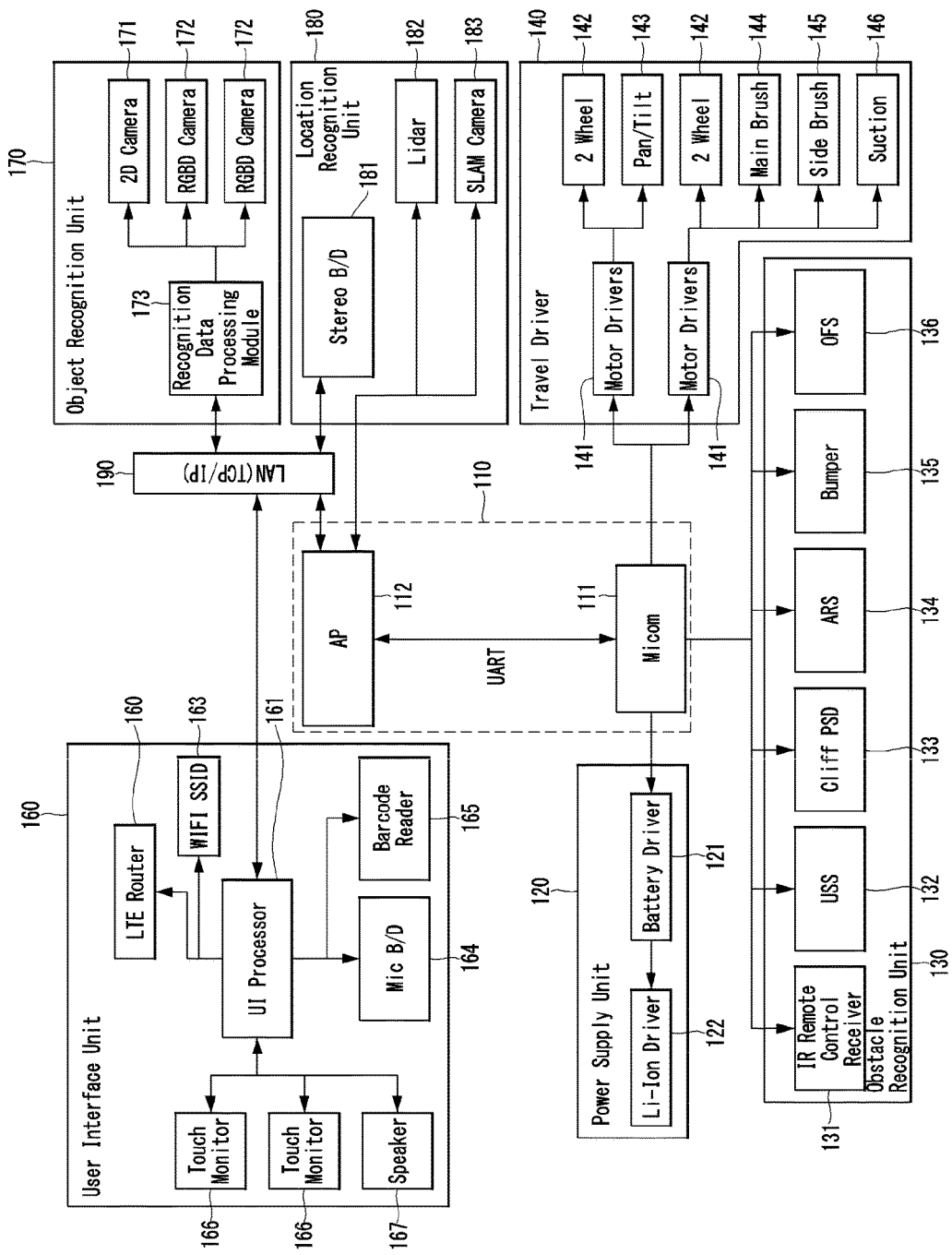
FIG. 9 is a block diagram illustrating hardware configuration of an intelligent robot device according to an embodiment of the present disclosure.

FIG. 9 is a block diagram illustrating hardware configuration of an intelligent robot device according to an embodiment of the present disclosure.

As illustrated in FIG. 9, hardware of an intelligent robot device 100 according to an embodiment of the present disclosure may include a Micom group and an application processor (AP) group. However, the present disclosure is not limited thereto. For example, the Micom group and the AP group may be formed as one controller 110 (see FIG. 8).

A Micom 111 may manage a power supply unit 120 including a battery, etc., an obstacle recognition unit 130 including various sensors, and a travel driver 140 including a plurality of motors and wheels in the hardware of the intelligent robot device 100. The Micom 111 may be referred to as a first controller 110 (see FIG. 7).

The power supply unit 120 may include a battery driver 121 and a Li-ion battery 122. The battery driver 121 may manage the charging and discharging of the Li-ion battery 122. The Li-ion battery 122 may supply electric power for the driving of the intelligent robot device 100. For example, the Li-ion battery 122 may be configured by connecting two 24V/102 A Li-ion batteries in parallel.

The obstacle recognition unit 130 may include an IR remote control receiver 131, an ultrasonic sensor (USS) 132, a cliff PSD 133, an attitude reference system (ARS) 134, a bumper 135, and an optical flow sensor (OFS) 136.

The IR remote control receiver 131 may include a sensor that receives a signal of an IR remote control for remotely controlling the intelligent robot device 100.

The USS 132 may include a sensor that decides a distance between an obstacle and the intelligent robot device 100 using an ultrasonic signal.

The cliff PSD 133 may include a sensor that senses a cliff or a bluff, etc. in a range of travel of the intelligent robot device 100 in all directions of 360 degrees.

The ARS 134 may include a sensor that can detect an attitude of the intelligent robot device 100. The ARS 134 may include a sensor consisting of 3-axis accelerometer and 3-axis gyroscope that detect an amount of rotation of the intelligent robot device 100.

The bumper 135 may include a sensor that senses a collision between the intelligent robot device 100 and the obstacle. The sensor included in the bumper 135 may sense the collision between the intelligent robot device 100 and the obstacle in a range of 360 degrees.

The OFS 136 may include a sensor that can sense a phenomenon, in which wheels of the intelligent robot device 100 spin during travel of the intelligent robot device 100, and measure a travel distance of the intelligent robot device 100 on various floor surfaces.

The travel driver 140 may include motor drivers 141, a wheel motor 142, a rotary motor 143, a main brush motor 144, a side brush motor 145, and a suction motor 146.

The motor drivers 141 may serve to drive a wheel motor, a brush motor, and a suction motor for the travelling and the cleaning of the intelligent robot device 100.

The wheel motor 142 may drive a plurality of wheels for the travelling of the intelligent robot device 100. The rotary motor 143 may be driven for left-right rotation and up-down rotation of the main body or a head (not shown) of the intelligent robot device 100, or may be driven for the wheel direction change or the rotation of the intelligent robot device 100.

The main brush motor 144 may drive a brush that sweeps up filth on the airport floor. The side brush motor 145 may drive a brush that sweeps up filth on a peripheral area of an outer surface of the intelligent robot device 100.

The suction motor 146 may be driven to suck filth on the airport floor.

The application processor (AP) 112 may serve as a central processing unit, i.e., the controller 110 (see FIG. 8) for entirely managing a hardware module system of the intelligent robot device 100. The AP 112 may run an application program for travelling using location information received from various sensors and transmit input and output information of airport users to the Micom 111 to drive the motor, etc.

A user interface unit 160 may include a user interface (UI) processor 161, a 5G router 162, WIFI SSID 163, a microphone board 164, a barcode reader 165, a touch monitor 166, and a speaker 167. The user interface unit 160 may be referred to as a display unit.

The UI processor 161 may control an operation of the user interface unit 160 that is responsible for the input and output of the airport user.

The 5G router 162 may receive necessary information from the outside and perform 5G communication for transmitting information to the airport user.

The WIFI SSID 163 may analyze a signal strength of WiFi and perform location recognition of a specific object or the intelligent robot device 100.

The microphone board 164 may receive a plurality of microphone signals, process a voice signal into voice data which is a digital signal, and analyze a direction of the voice signal and the corresponding voice signal.

The barcode reader 165 may read barcode information stated in a plurality of tickets used in the airport.

The touch monitor 166 may include a touch panel configured to receive an input of the airport user and a monitor for displaying output information.

The speaker 167 may serve to inform the airport user of specific information by voice.

An object recognition unit 170 may include a camera 171, an RGBD camera 172, and a recognition data processing module 173. The object recognition unit 170 may be referred to as a photographing unit.

The camera 171 may be a sensor for recognizing an obstacle based on a two-dimensional (2D) image. The obstacle may include a person or an object, or the like.

The RGBD (Red, Green, Blue, Distance) camera 172 may be a sensor for detecting an obstacle using captured images having depth data obtained from a camera having RGBD sensors or other similar 3D imaging devices.

The recognition data processing module 173 may process signals such as 2D image/video or 3D image/video obtained from a 2D camera 171 and a RGBD camera 172 and recognize the obstacle.

A location recognition unit 180 may include a stereo board (B/D) 181, a light detection and ranging (LiDAR) 182, and a simultaneous localization and mapping (SLAM) camera 183.

The SLAM camera 183 may implement simultaneous location tracking and mapping technology.

The intelligent robot device 100 may detect surrounding information using the SLAM camera 183 and process the obtained information to thereby create a map corresponding to a task execution space and at the same time estimate its own absolute location.

The LiDAR 182 is a laser radar and may also be a sensor that irradiates a laser beam and collects and analyzes back-scattered light among light absorbed or scattered by aerosol to perform location recognition.

The stereo board 181 may process sensing data collected by the LiDAR 182 and the SLAM camera 183, etc. and may be responsible for data management for the location recognition and the obstacle recognition of the intelligent robot device 100.

A LAN 190 may communicate with the UI processor 161 that is related to the input and output of the airport user, the recognition data processing module 173, the stereo board 181, and the AP 150.

Figure 10:
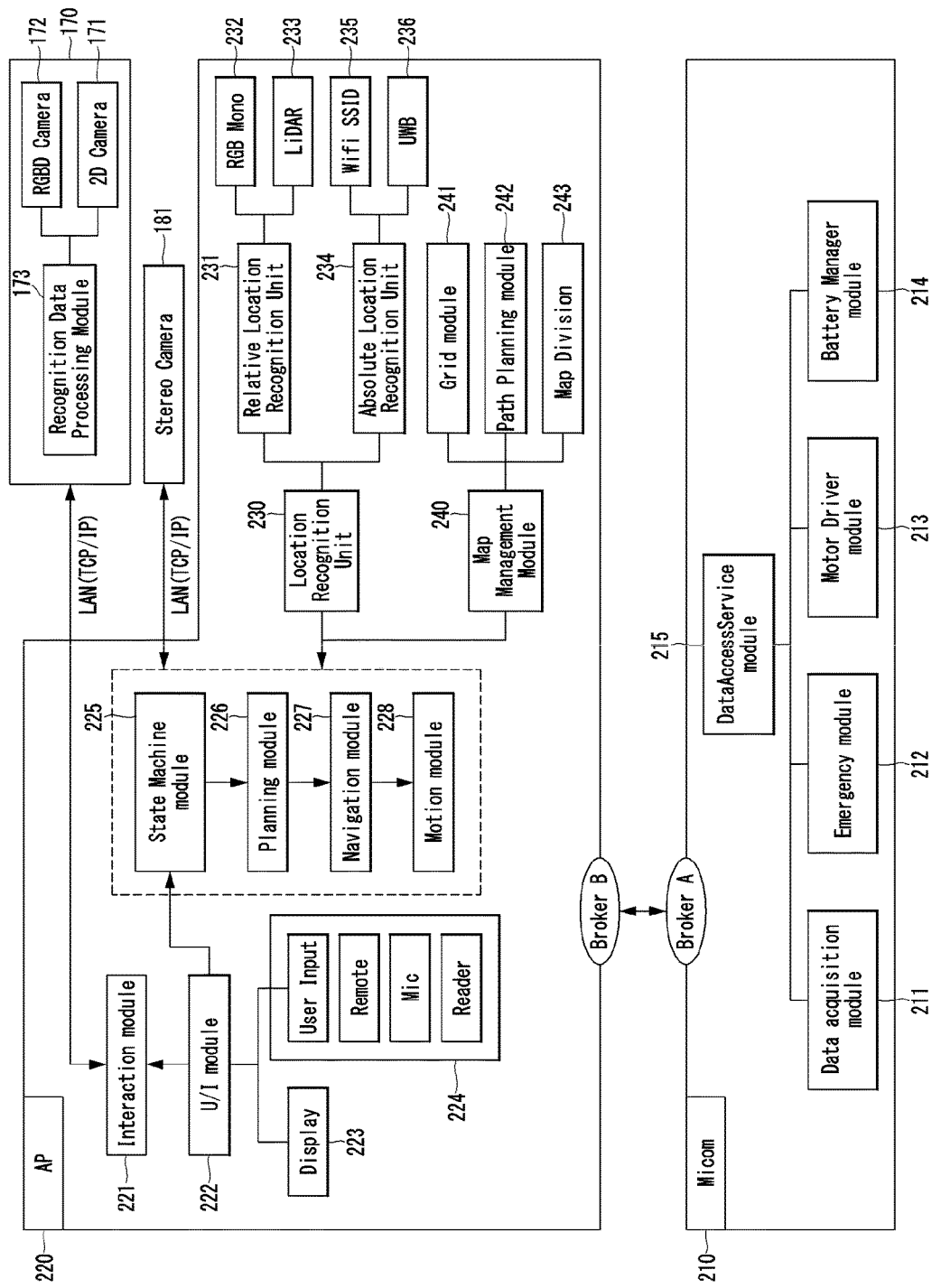
FIG. 10 illustrates in detail configuration of Micom and AP of an intelligent robot device according to another embodiment of the present disclosure.

FIG. 10 illustrates in detail configuration of Micom and AP of an intelligent robot device according to another embodiment of the present disclosure.

As illustrated in FIG. 10, a controller 110 (see FIG. 8) may be implemented in various examples in order to control recognition and behaviour of an intelligent robot device 100. The controller 110 (see FIG. 8) may include a Micom 210 and an AP 220. FIG. 10 illustrates that the Micom 210 and the AP 220 are separated from each other. However, the present disclosure is not limited thereto. For example, they may be formed as one body.

For example, the Micom 210 may include a data access service module 215.

The data access service module 215 may include a data acquisition module 211, an emergency module 212, a motor driver module 213, and a battery manager module 214.

The data acquisition module 211 may acquire data sensed by a plurality of sensors included in the intelligent robot device 100 and transmit the acquired data to the data access service module 215.

The emergency module 212 is a module capable of sensing an abnormal state of the intelligent robot device 100. If the intelligent robot device 100 performs a predetermined type of behaviour, the emergency module 212 may sense that the intelligent robot device 100 has entered an abnormal state.

The motor driver module 213 may manage a drive control of a wheel, a brush, and a suction motor for the travelling and the cleaning of the intelligent robot device 100.

The battery manager module 214 may be responsible for the charging and discharging of the Li-ion battery 122 shown in FIG. 9 and may transfer a battery status of the intelligent robot device 100 to the data access service module 215.

The AP 220 may serve as a controller 110 (see FIG. 8) that receives inputs of various cameras, various sensors, and the airport user and recognizes and processes the inputs to thereby control an operation of the intelligent robot device 100.

An interaction module 221 may be a module that combines recognition data received from the recognition data processing module 173 and an input of the airport user received from a user interface module 222 and oversees software which allows the airport user and the intelligent robot device 100 to interact with each other.

The user interface module 222 may manage the input of the airport user received from a user input unit 224 that receives a near command of the airport user using a display 223, a key, a touch screen, a reader, etc. which is a monitor for a current situation and operation/provision of information of the intelligent robot device 100, or receives a remote signal such as a signal of an IR remote control for remotely controlling the intelligent robot device 100, or receives an input signal of the airport user from a microphone or a barcode reader, etc.

If at least one input of the airport user is received, the user interface module 222 may transmit input information of the airport user to a state machine module 225. The state machine module 225 receiving the input information of the airport user may manage the overall state of the intelligent robot device 100 and give appropriate commands corresponding to the input of the airport user.

A planning module 226 may determine start and end time points/behavior for a specific operation of the intelligent robot device 100 according to a command received from the state machine module 225 and may calculate which path the intelligent robot device 100 should take.

A navigation module 227 is responsible for the overall travel of the intelligent robot device 100 and may cause the intelligent robot device 100 to travel according to a travel path calculated by the planning module 226. A motion module 228 may cause the intelligent robot device 100 to perform other operations in addition to the travelling.

The intelligent robot device 100 according to another embodiment of the present disclosure may include a location recognition unit 230. The location recognition unit 230 may include a relative location recognition unit 231 and an absolute location recognition unit 234.

The relative location recognition unit 231 may correct an amount of movement of the intelligent robot device 100 through an RGM mono sensor 232, calculate an amount of movement of the intelligent robot device 100 for a predetermined time, and recognize a current surrounding environment of the intelligent robot device 100 through a LiDAR 233.

The absolute location recognition unit 234 may include a Wifi SSID 235 and a UWB 236. The WiFi SSID 235 is an UWB sensor module for absolute location recognition of the intelligent robot device 100 and is also a WiFi module for estimating a current location through WiFi SSID detection. The WiFi SSID 235 may analyze a signal strength of WiFi and recognize a location of the intelligent robot device 100.

The UWB 236 may calculate a distance between a transmitter and a receiver and sense an absolute location of the intelligent robot device 100.

The intelligent robot device 100 according to another embodiment of the present disclosure may include a map management module 240.

The map management module 240 may include a grid module 241, a path planning module 242, and a map division module 243.

The grid module 241 may manage map data of a surrounding environment for the location recognition previously input to the intelligent robot device 100 on a grid-shaped map or dictionary that the intelligent robot device 100 creates through the SLAM camera.

The path planning module 242 may be responsible to calculate a travel path of the intelligent robot device 100 in the map division for collaboration between the plurality of intelligent robot devices 100.

The path planning module 242 may also calculate a travel path through which the intelligent robot device 100 should move in an environment where one intelligent robot device 100 is operating.

The map division module 243 may calculate in real time a zone for which each of the plurality of intelligent robot devices 100 should be responsible.

Data that is sensed and calculated by the location recognition unit 230 and the map management module 240 may be transmitted again to the state machine module 225. The state machine module 225 may command the planning module 226 to control the operation of the intelligent robot device 100 based on the data that is sensed and calculated by the location recognition unit 230 and the map management module 240.

Hereinafter, various examples of a navigation service that the above-described intelligent robot device 100 disposed in the airport provides to the airport users will be described.

Figure 11:
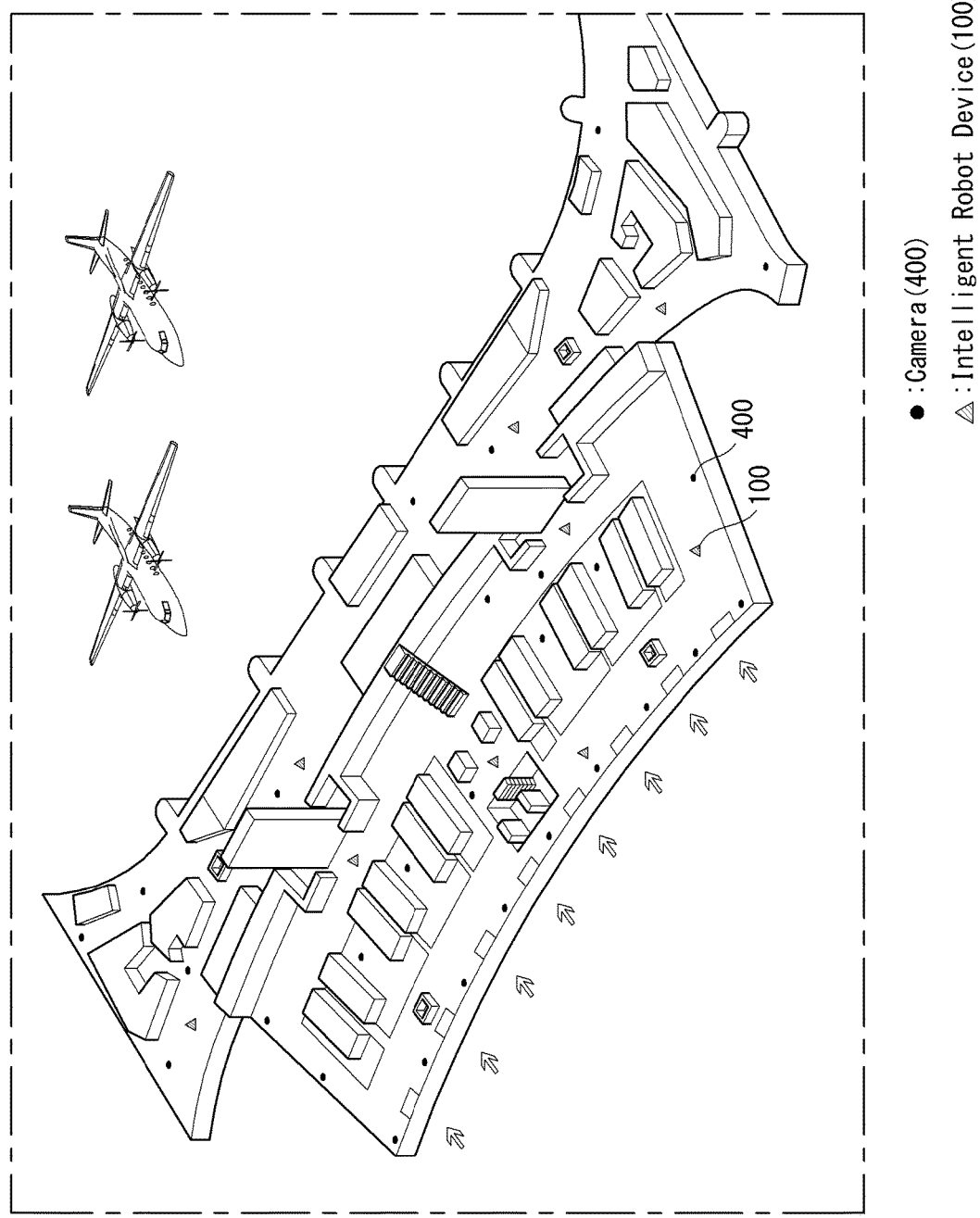
FIG. 11 illustrates a plurality of intelligent robot devices and a plurality of cameras arranged in the airport in accordance with an embodiment of the present disclosure.
Figure 12:
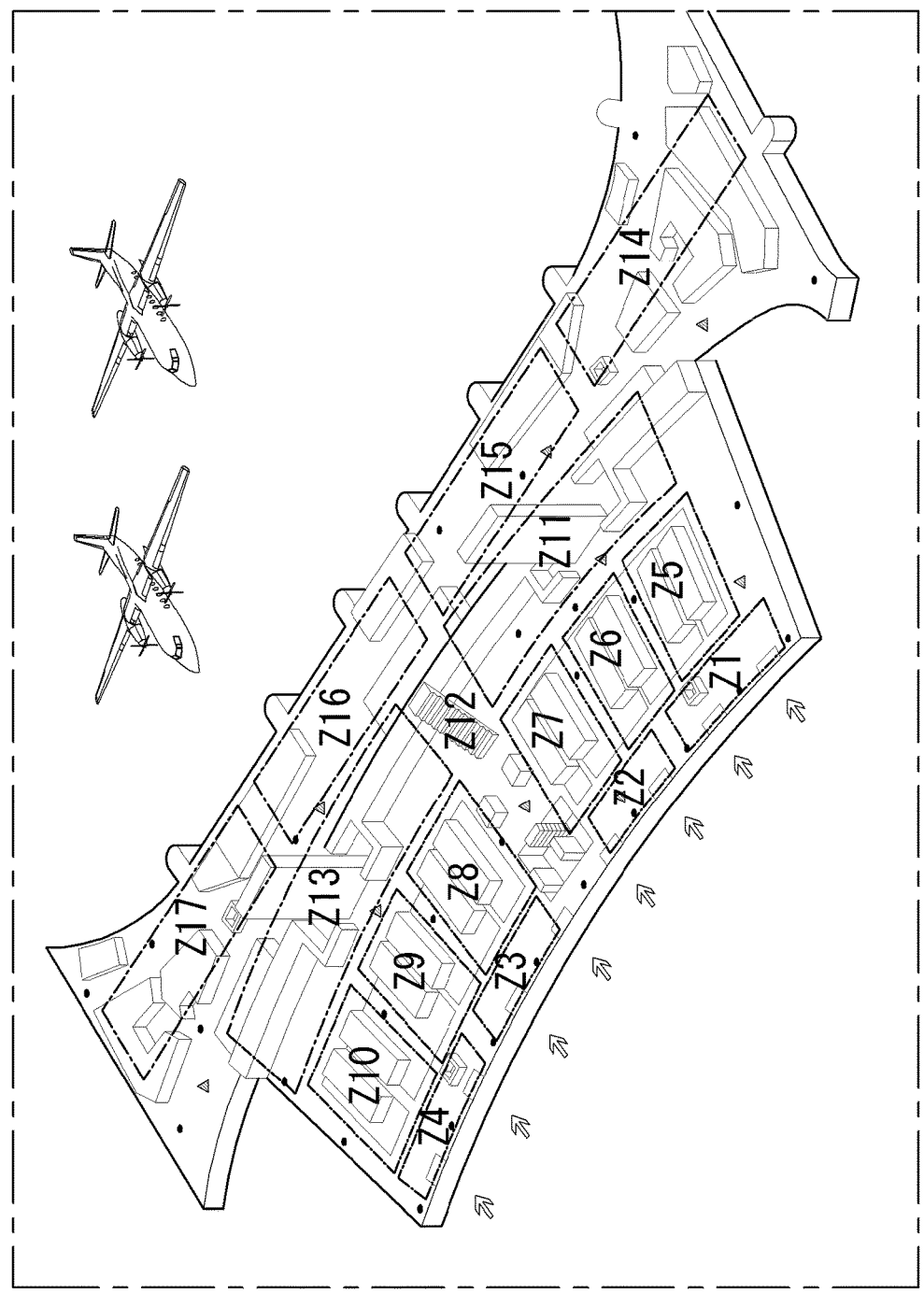
FIG. 12 illustrates that the airport is divided into a plurality of zones in accordance with an embodiment of the present disclosure.

FIG. 11 illustrates a plurality of intelligent robot devices and a plurality of cameras disposed in the airport in accordance with an embodiment of the present disclosure. FIG. 12 illustrates that the airport is divided into a plurality of zones in accordance with an embodiment of the present disclosure.

Referring to FIGS. 11 and 12, a plurality of intelligent robot devices 100 may be disposed in the airport. Each of the plurality of intelligent robot devices 100 can provide various services including guide, patrol, cleaning, or disinfect, or the like in the airport and can provide a navigation service or various information to customers or airport users. According to an embodiment of the present disclosure, the plurality of intelligent robot devices 100 is dividedly disposed in the zones of the airport and thus can provide more efficiently airport services.

Each intelligent robot device 100 can provide a navigation service while moving to the zone of the airport. For example, a first intelligent robot device 100 allocated in a Z1 zone can provide the navigation service while moving only in the Z1 zone.

A plurality of cameras 400 may also be disposed in the airport. Each of the plurality of cameras 400 may capture the plurality of intelligent robot devices 100, customer, or airport users in the airport and provide various mobility or location services such as their current locations and moving paths.

According to an embodiment of the present disclosure, the plurality of cameras 400 is dividedly disposed in the zones of the airport and thus can provide more efficiently airport services.

Referring to FIG. 12, a server 300 (see FIG. 6) according to an embodiment of the present disclosure may divide the inside of the airport into a plurality of zones. The server 300 (see FIG. 6) may set the plurality of zones Z1 to Z17 and dispose at least one intelligent robot device 100 in each of the divided zones Z1 to Z17.

The server 300 may change the zones at predetermined time intervals based on various information (e.g., flight schedules, airport user density per zone, etc.) of the airport. The server 300 may control the plurality of cameras 400 disposed in the airport and differently set a range of the captured zone or area. For example, a first camera that normally captures the Z1 zone may capture a zone smaller than the Z1 zone under the control of the server 300. Alternatively, a second camera that captures the Z2 zone adjacent to the Z1 zone may capture a zone wider than the Z2 zone under the control of the server 300.

The server 300 may adjustably rearrange at least one intelligent robot device 100 in each of the zones changed every predetermined time.

Each intelligent robot device 100 can provide the navigation service while moving in the divided zone. For example, the first intelligent robot device 100 allocated in the Z1 zone may patrol only in the Z1 zone and provide the navigation service. That is, if a destination requested by the airport user exists in the Z1 zone, the first intelligent robot device 100 may escort the airport user to the destination.

On the other hand, if a destination requested by the airport user does not exist in the Z1 zone, the first intelligent robot device may escort the airport user up to a path included in the Z1 zone on a path to the destination. Afterwards, the first intelligent robot device may call one of other intelligent robot devices, that patrol other zones adjacent to the Z1 zone, and provide the called intelligent robot device with information about the destination requested by the airport user and a remaining path of the destination, so that the called intelligent robot device can escort the airport user to the destination.

Figure 13:
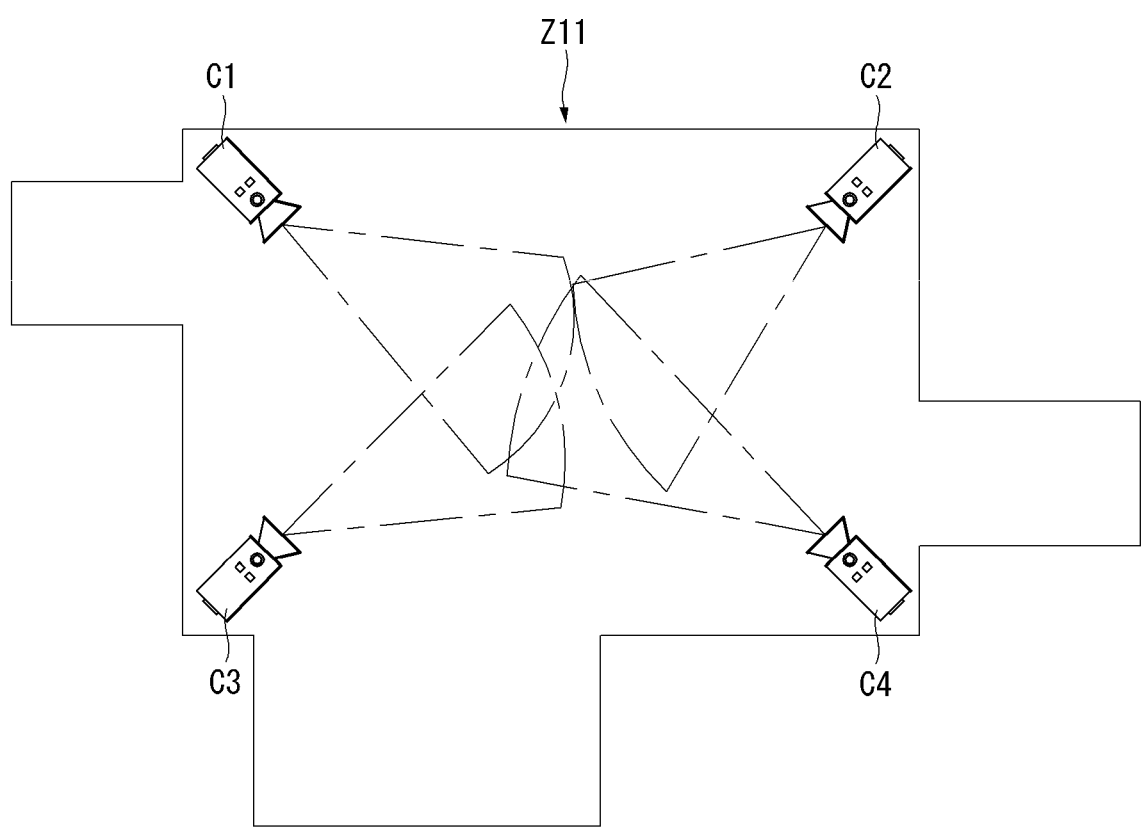
FIG. 13 illustrates that a plurality of cameras is disposed in a predetermined zone in accordance with an embodiment of the present disclosure.

FIG. 13 illustrates that a plurality of cameras is disposed in various positions in accordance with an embodiment of the present disclosure.

Referring to FIG. 13, a plurality of cameras may be disposed in various positions in a Z11 zone in accordance with an embodiment of the present disclosure. The plurality of cameras may include first to fourth cameras C1 to C4.

The first camera C1 may be disposed at a first corner of the Z11 zone. For example, the first corner may be disposed on the left rear side of the Z11 zone. The second camera C2 may be disposed at a second corner of the Z11 zone. For example, the second corner may be disposed on the right rear side of the Z11 zone. The third camera C3 may be disposed at a third corner of the Z11 zone. For example, the third corner may be disposed on the left front side of the Z11 zone. The fourth camera C4 may be disposed at a fourth corner of the Z11 zone. For example, the fourth corner may be disposed on the right front side of the Z11 zone.

Each of the first to fourth cameras C1 to C4 can thoroughly capture the entire Z11 zone without omission while rotating in the direction of 360 degrees. Further, if the first to fourth cameras C1 to C4 capture one of the intelligent robot device 100 (see FIG. 6), the customer, or the airport user as a target, a portion of the Z11 zone may be captured overlappingly.

Figure 14:
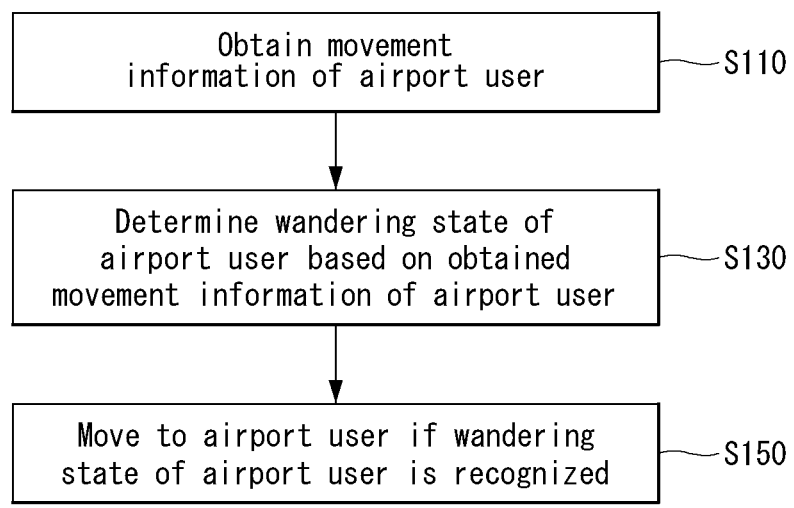
FIG. 14 is a flow chart illustrating a method of identifying a behavior direction recognition based service requester according to an embodiment of the present disclosure.

FIG. 14 is a flow chart illustrating a method of identifying a behavior direction recognition based service requester according to an embodiment of the present disclosure.

A method of identifying a behavior direction recognition based service requester according to an embodiment of the present disclosure may be implemented by an intelligent robot device including the functions described with reference to FIGS. 1 to 13, or a server controlling the intelligent robot device.

The processor 110 (see FIG. 8) may obtain movement information of an airport user in S110. For example, the processor 110 may provide or receive movement information of an airport user from an external device (e.g., a server, another intelligent robot device, etc.) using the communication unit 190 (see FIG. 8).

The processor 110 may obtain movement information of the airport user through at least one camera placed in the airport. Alternatively, the processor 110 may obtain movement information of the airport user from at least one sensor disposed inside the intelligent robot device. The at least one sensor may be at least one camera included in the intelligent robot device. For example, the camera may be arranged to photograph the intelligent robot device in the front, rear, left, and right directions.

The processor 110 may determine a wandering state of the airport user based on the movement information of the airport user in S130.

The processor 110 may analyzes images obtained from the camera placed in the airport or the camera mounted inside the intelligent robot device to extract or calculate the movement information of the airport user. For example, the movement information of the airport user may include a directionality of the airport user, a direction value of the airport user, a movement path of the airport user, a slope of a movement path of the airport user, a movement speed of the airport user, and the like.

The processor 110 may determine a wandering state of the airport user based on the extracted movement information of the airport user. For example, the processor 110 may determine that the airport user is in the wandering state if the directionality of the airport user or the direction value of the airport user exceeds a predetermined reference value. Further, for example, if the slope of the movement path of the airport user exceeds a predetermined reference value, the processor 110 may determine that the airport user is in the wandering state. For example, if the movement speed of the airport user is less than a predetermined movement speed, the processor 110 may determine that the airport user is in the wandering state. That is, when the airport user knows exactly a destination and moves to the destination, the processor 110 may set the directionality, the direction value, the slope of the movement path, or the movement speed of the airport user to a reference value, analyze an image obtained through the camera based on the set reference value, and learn an result of the analysis. A detailed process for determining the wandering state of the airport user will be described below with reference to FIG. 15. As described above, determining the wandering state of the airport user based on the movement information of the airport user may be implemented by the intelligent robot device itself, or the 5G network.

If the processor 110 recognizes the wandering state of the airport user, the processor 110 may move toward the airport user in S150. The processor 110 may set the airport user of the wandering state as a target. The processor 110 may set the airport user of the wandering state as a target, control the travel driver 140 (see FIG. 8), and move to the set target. The processor 110 may receive coordinates of the wandering airport user from the communication unit 190 (see FIG. 8) and move based on the received coordinates. The processor 110 may move or travel to the wandering airport user by reflecting the coordinates of the airport user that are changed in real time.

The processor 110 may receive various information taken with the camera 170 (see FIG. 8) during the movement and move while avoiding surroundings or obstacles.

In this instance, the processor 110 may control the travel driver 140 and control a movement speed, a movement direction, etc. of the intelligent robot device moving up to the airport user.

Figure 15:
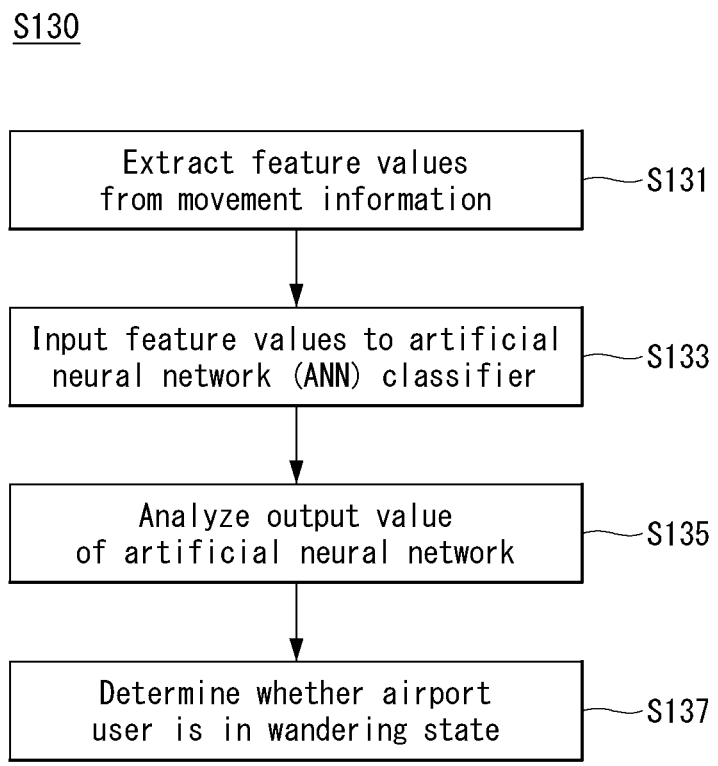
FIG. 15 illustrates an example of determining a wandering state of an airport user in accordance with an embodiment of the present disclosure.

FIG. 15 illustrates an example of determining a wandering state of an airport user in accordance with an embodiment of the present disclosure.

Referring to FIG. 15, the processor 110 may extract feature values from sensing information obtained through at least one sensor, in order to determine a wandering state of the airport in S131.

For example, the processor 110 may receive movement information of the airport user from a plurality of cameras placed in the airport using the communication unit 190. The processor 110 may extract feature values from the movement of the airport user. The feature value is determined as a feature specifically indicating whether or not the airport user is in the wandering state, among one or more features capable of extracting from the movement of the airport user.

The processor 110 may control the feature values to be input to an artificial neural network (ANN) classifier trained to distinguish whether or not the airport user is in the wandering state in S133.

The processor 110 may combine the extracted feature values and generate a wandering detection input. The wandering detection input may be input to an artificial neural network (ANN) classifier trained to distinguish whether or not the airport user is in the wandering state based on the extracted feature value.

The processor 110 may analyze an output value of an artificial neural network in S135 and determine the wandering state of the airport user based on the output value of the artificial neural network in S137.

The processor 110 may identify whether a driver starts to sleep or is in a drowsy state from an output of the artificial neural network classifier.

FIG. 15 illustrates that the operation of identifying the wandering state of the airport user through the AI processing is implemented in the processing of the intelligent robot device 100, by way of example. However, the present disclosure is not limited thereto. For example, the AI processing may be implemented on the 5G network based on sensing information received from the intelligent robot device 100.

Figure 16:
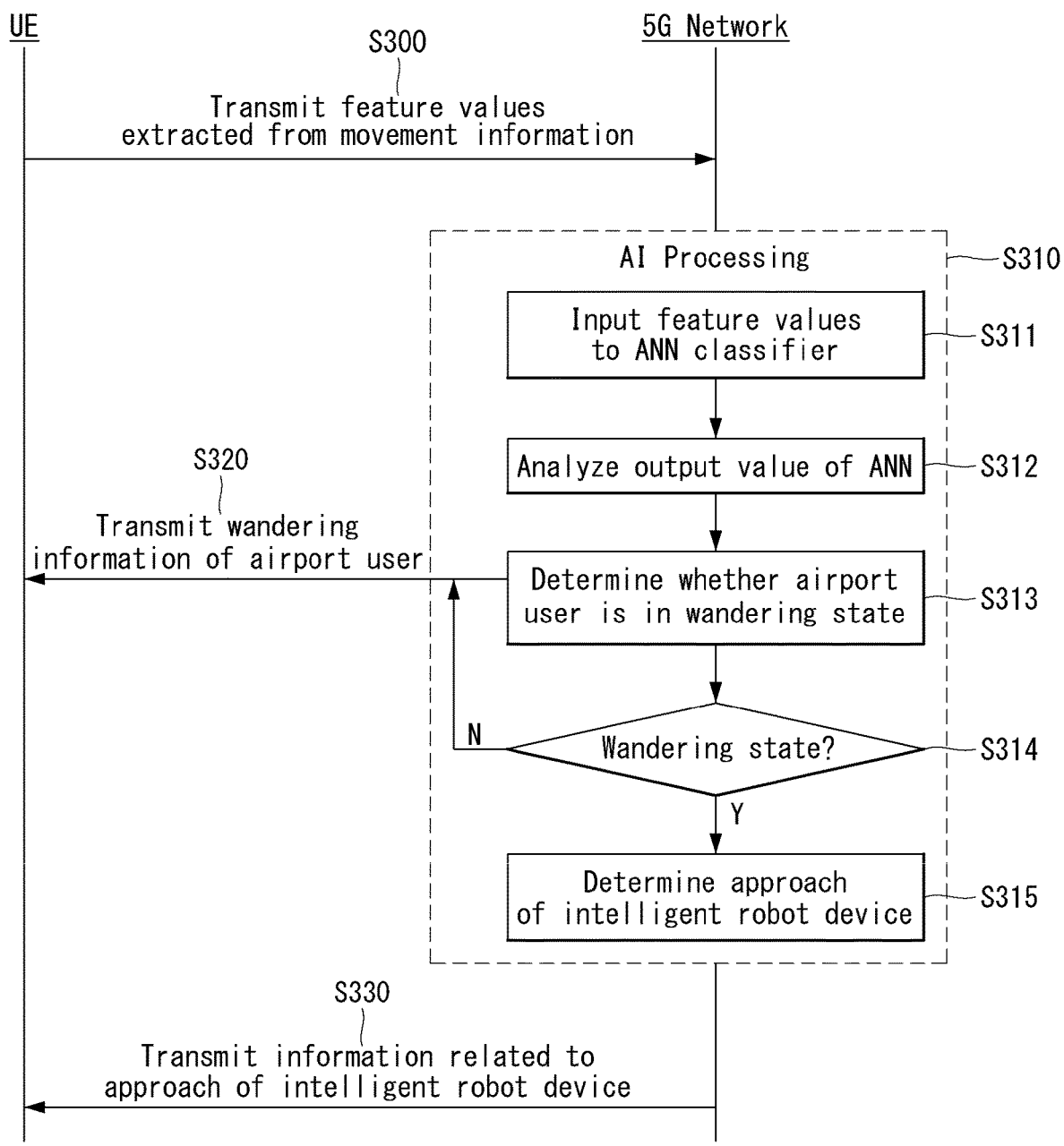
FIG. 16 illustrates another example of determining a wandering state of an airport user in accordance with an embodiment of the present disclosure.

FIG. 16 illustrates another example of determining a wandering state of an airport user in accordance with an embodiment of the present disclosure.

The processor 110 may control the communication unit to transmit movement information of an airport user to an AI processor included in a 5G network. Further, the processor 110 may control the communication unit to receive information that is AI-processed by the AI processor.

The AI-processed information may be information that determines whether or not the airport user is in the wandering state.

The intelligent robot device may perform an initial connection procedure with the 5G network in order to transmit information about the wandering state of the airport user to the 5G network. The intelligent robot device may perform the initial connection procedure with the 5G network based on a synchronization signal block (SSB).

The intelligent robot device may receive, from the network, downlink control information (DCI) that is used to schedule transmission of movement information of the airport user obtained by at least one sensor or camera included inside the intelligent robot device or a plurality of cameras placed in the airport via a wireless communication unit.

The processor may transmit the movement information of the airport user to the network based on the DCI.

The movement information of the airport user may be transmitted to the network via a PUSCH, and DM-RSs of the SSB and the PUSCH may be quasi co-located (QCL) to a QCL type D.

Referring to FIG. 16, the intelligent robot device may transmit feature values extracted from movement information of the airport user to the 5G network in S300.

Here, the 5G network may include an AI processor or an AI system, and the AI system of the 5G network may perform AI processing based on the obtained or received movement information of the airport user in S310.

The AI system may input the feature values received from the intelligent robot device to the ANN classifier in S311. The AI system may analyze an output value of an ANN in S312 and determine the wandering state of the airport user based on the output value of the ANN in S313. The 5G network may transmit, to the intelligent robot device, information about the wandering state of the airport user determined by the AI system through a wireless communication unit.

Here, the information about the wandering state of the airport user may include whether or not the airport user is in the wandering state, and the like.

If the AI system determines that the airport user is in the wandering state in S314, the AI system may control the intelligent robot device to move to or approach the airport user of the wandering state.

If the AI system determines that the airport user is in the wandering state, the AI system may determine a priority in S315. Further, the AI system may transmit information (or signal) related to the priority to the intelligent robot device.

The intelligent robot device may transmit only the movement information of the airport user to the 5G network and extract a feature value corresponding to a wandering detection input that is used as an input of the artificial neural network for determining the wandering state of the airport user based on the movement information of the airport user inside the AI system included in the 5G network.

Figure 17:
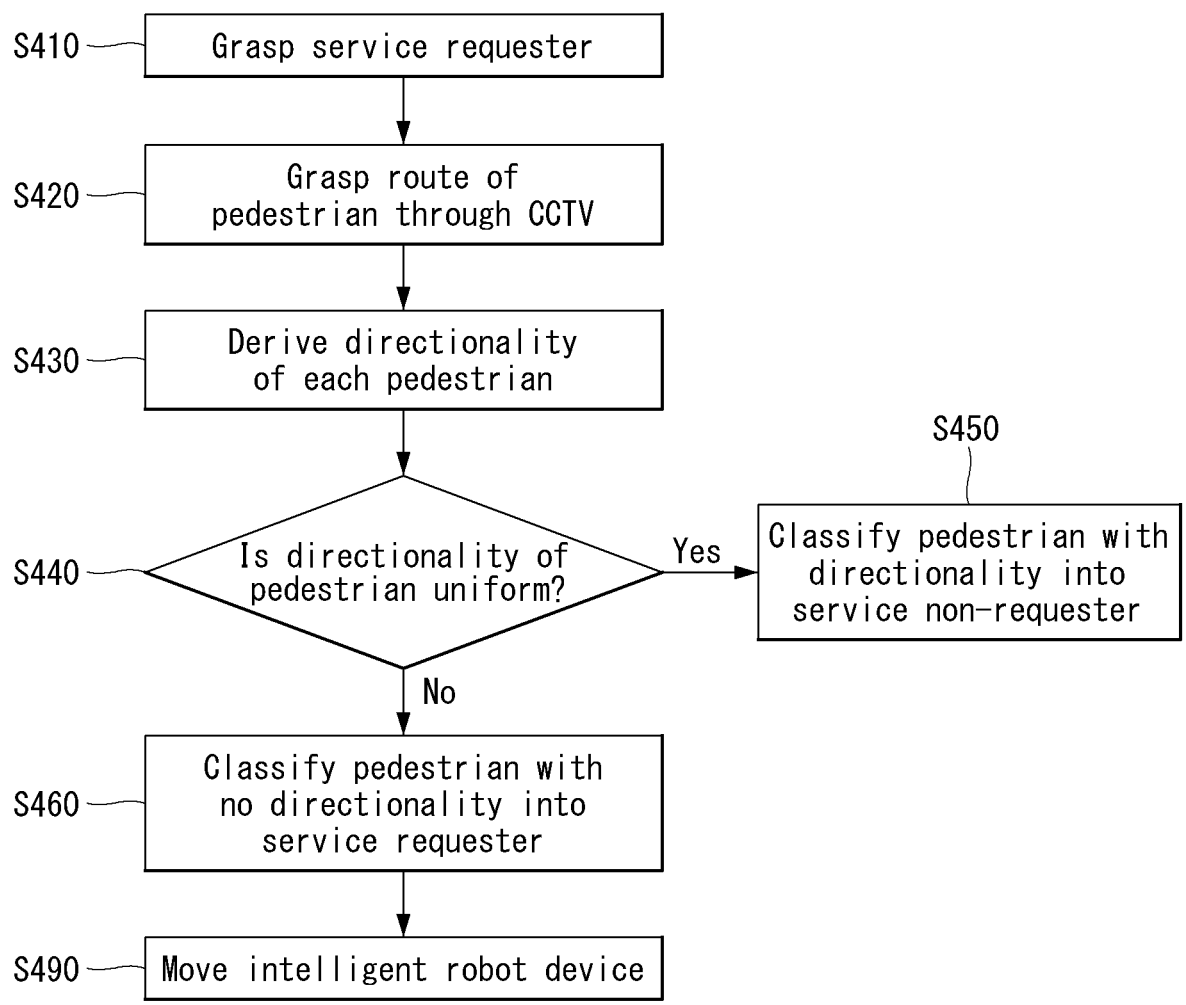
FIG. 17 illustrates an example of a method of identifying a behavior direction recognition based service requester according to an embodiment of the present disclosure.

FIG. 17 illustrates an example of a method of identifying a behavior direction recognition based service requester according to an embodiment of the present disclosure. FIGS. 18A and 18B illustrate directionality of an airport user in accordance with an embodiment of the present disclosure.

Referring to FIG. 17, a control system may sense an airport user of a wandering state among a plurality of airport users moving in the airport and move an intelligent robot device around or near the sensed airport user.

The control system may transmit in real time information about a movement of the airport user to the intelligent robot device. The control system may sense or photograph the plurality of airport users, who is wandering around or moving in the airport, using multiple airport cameras placed in the airport and extract or grasp the airport user requiring airport services in S410.

A processor may receive movement information of the airport users from a server. The processor may grasp a route of the airport user received. That is, the processor may grasp a route of the airport user based on the movement information of the airport user received from the CCTV in the airport in S420.

The processor may learn the movement information of the airport users and extract or derive the wandering state of the airport users in S430. Since the description thereof was described in detail with reference to FIGS. 15 and 16, the description will be omitted below. For example, the processor may extract and learn features values for the movement information of the airport users to thereby derive directionality of the airport user.

The processor may recognize the directionality of the airport user from the extracted feature value in S440. For example, as illustrated in FIG. 18A, if the directionality of the airport user is not derived from a result of learning the extracted feature value, the processor may recognize that the airport user is in a wandering state, in which he/she cannot find a destination or has not destination in S460. Hence, the processor may control a travel driver and move toward an airport service requester in S490.

On the contrary, as illustrated in FIG. 18B, if the directionality of the airport user is derived from a result of learning the extracted feature value, the processor may determine that the airport user is in a normal state, in which he/she is heading for the destination in S450.

FIG. 19 illustrates directionality of an airport user illustrated in FIGS. 18A and 18B using a slope of a movement path of the airport user.

As illustrated in FIG. 19, the processor may analyze directionality of an airport user through a slope of a movement path of the airport user. That is, the processor may analyze the slope of the movement path and extract or derive the directionality of the airport user. The processor may recognize that the airport user has the directionality if the airport user moves or walks in one direction even if the movement path is not straight.

The processor may analyze the recognized directionality of the airport user and determine whether the directionality of the airport user is uniform or not in S440. If the processor determines that the recognized directionality of the airport user is uniform, the processor may classify the airport user as an airport service non-requester. That is, if the processor determines that the airport user moves with uniform directionality in S440, the processor may classify the airport user as an airport service non-requester who does not require airport services in S450

If the processor determines that the recognized directionality of the airport user is not uniform, the processor may classify the airport user as an airport service requester. That is, if the processor determines that the airport user moves with non-uniform directionality in the airport in S440, the processor may classify the airport user as an airport service requester who requires airport services in S460. Hence, the processor may control the travel driver and move toward the airport service requester.

Figure 20:
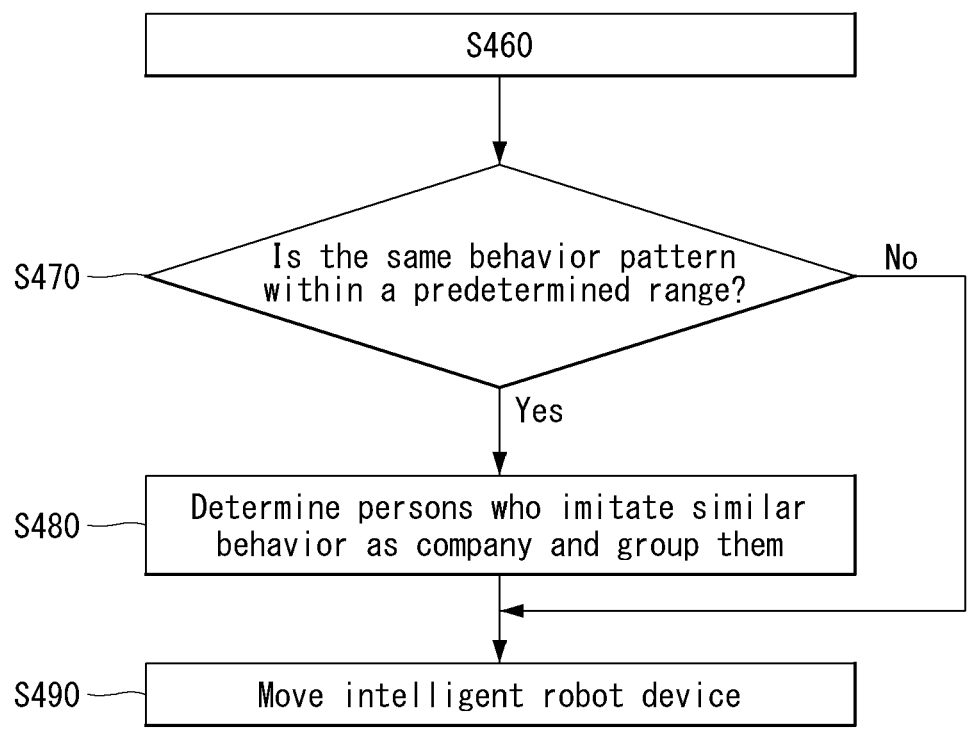

FIGS. 20 and 21A and B illustrate a method of extracting a companion related to a wandering airport user in accordance with an embodiment of the present disclosure.

As illustrated in FIG. 20, the processor may extract or sense other airport user who moves along substantially the same or similar movement path within a predetermined range based on an airport service requester in S470.

If the processor extracts or senses other airport user who moves along substantially the same movement path or the same movement pattern as an airport user, the processor may determine that the other airport user is a companion with the airport user in S470 and set the airport user and the other airport user as one group. As illustrated in FIG. 21A, if there is other airport user having substantially similar directionality or direction value to an airport user around or near the airport user, the processor may determine that the other airport user is a companion with the airport user in S480.

The processor may control an intelligent robot device to move to or around the airport user of the wandering state. Alternatively, as illustrated in FIG. 21B, if an airport user of a wandering state among a plurality of airport users in the airport is recognized as a group of the airport users, the processor may control the intelligent robot device to move to or around group of the airport users in S490.

FIGS. 22A and 22B illustrate that directionality of an airport user is tracked and determined in accordance with an embodiment of the present disclosure.

As illustrated in FIGS. 22A and 22B, a plurality of cameras placed in the airport may continuously photograph airport users moving in the airport and continue to sense their movement.

As illustrated in FIGS. 22A and 22B, an intelligent robot device may receive movement information of a selected airport user among a plurality of airport users and may check a moving distance, a moving direction, etc. of the airport user. The processor may track the movement information of the selected airport user for a predetermined time.

For example, as illustrated in FIG. 22A, the intelligent robot device may sense the movement information of the selected airport user at least three times for a predetermined time and then extract or calculate directionality of the airport user based on the sensed movement information. For example, if the selected airport user moves in a first direction for 0 to 10 seconds, moves in a second direction for 10 to 30 seconds, moves in a third direction for 30 to 60 seconds, and moves in a fourth direction for 60 to 120 seconds, the intelligent robot device may determine that the airport user has no directionality. The intelligent robot device may calculate slopes of the first to fourth directions and determine that the first to fourth directions are different directions if the calculated slopes are out of a predetermined range. The intelligent robot device may determine that the airport user has no directionality based on a result of the determination.

Hence, the intelligent robot device may search an airport user requiring airport services through captured images, determine a state of the searched airport user based on movement information of the searched airport user, and first approach an airport user of a wandering state based on a result of the determination, thereby providing fast and accurate airport services and airport convenience.

For example, as illustrated in FIG. 22B, if the selected airport user moves in a 1-1 direction for 0 to 10 seconds, moves in a 1-2 direction for 10 to 30 seconds, moves in a 1-3 direction for 30 to 60 seconds, and moves in a 1-4 direction for 60 to 120 seconds, the intelligent robot device may determine that the airport user has directionality. The intelligent robot device may calculate slopes of the 1-1 to 1-4 directions and determine that the 1-1 to 1-4 directions are substantially the same direction if the calculated slopes are within a predetermined range. The intelligent robot device may determine that the airport user has directionality.

Hence, the intelligent robot device may search an airport user requiring airport services through captured images, determine a state of the searched airport user based on movement information of the searched airport user, and exclude airport users of a normal state based on a result of the determination, thereby providing quality airport services to the airport users requiring airport services.

Figure 24:
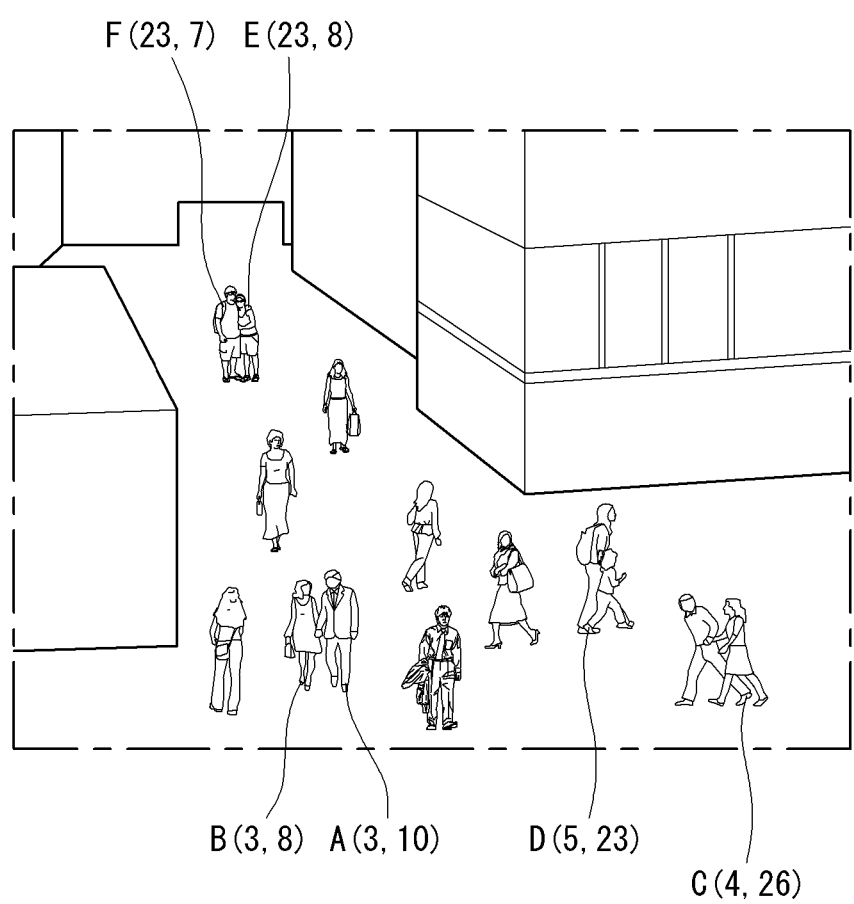
Figure 25:
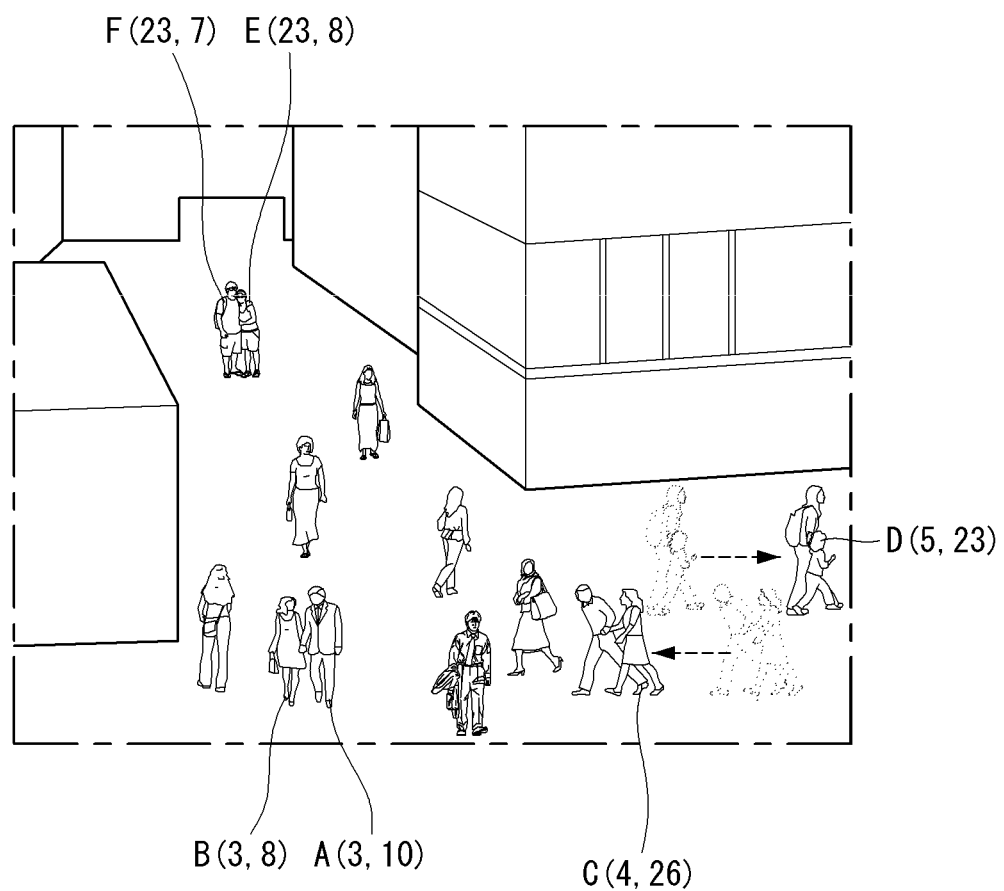

FIGS. 23 to 25 illustrate that directionality and movement of an airport user are combined and determined in accordance with an embodiment of the present disclosure.

Referring to FIG. 23, an intelligent robot device may perform a learning based on movement information of an airport user and determine a wandering state or a normal state of the airport user based on a result of the learning. The movement information of the airport user may include directionality of the airport user, coordinates corresponding to a current location of the airport user, and movement of the airport user.

The intelligent robot device may track each of airport users A to F among multiple airport users in the airport.

Referring to FIGS. 24 and 25, if the tracked airport user A is located at coordinates (3, 10) and moves without directionality, the intelligent robot device may determine that the airport user A moving without directionality is in a wandering state. Hence, the intelligent robot device may set the airport user A as a service requester.

If the tracked airport user B is located at coordinates (3, 8) and moves without directionality, the intelligent robot device may determine that the airport user B moving without directionality is in the wandering state. Further, the intelligent robot device may determine the airport user A and the airport user B as the same group based on that the airport user A and the airport user B are located nearby and move without directionality. Hence, the intelligent robot device may set both the airport user A and the airport user B as service requesters.

If the tracked airport user C is located at coordinates (4, 26) and moves in a right direction, the intelligent robot device may determine that the airport user C moving with uniform directionality is in a normal state. The intelligent robot device may determine that the airport user C moves toward a destination. Hence, the intelligent robot device may exclude the airport user C in the service requester and set the airport user C as a service non-requester.

If the tracked airport user D is located at coordinates (5, 23) and moves in a left direction, the intelligent robot device may determine that the airport user D moving with uniform directionality is in the normal state. The intelligent robot device may determine that the airport user D moves toward a destination. Hence, the intelligent robot device may exclude the airport user D in the service requester and set the airport user D as a service non-requester.

If the tracked airport user E is located at coordinates (23, 8) and does not move, the intelligent robot device may determine that the airport user E, who has not moved for a predetermined time, is in the normal state. Hence, the intelligent robot device may set the airport user E as a service non-requester.

If the tracked airport user F is located at coordinates (23, 7) and does not move, the intelligent robot device may determine that the airport user F, who has not moved for a predetermined time, is in the normal state. Hence, the intelligent robot device may set the airport user F as a service non-requester.

The present disclosure described above may be implemented using a computer-readable medium with programs recorded thereon for execution by a processor to perform various methods presented herein. The computer-readable medium includes all kinds of recording devices capable of storing data that is readable by a computer system. Examples of the computer-readable mediums include hard disk drive (HDD), solid state disk (SSD), silicon disk drive (SDD), ROM, RAM, CD-ROM, a magnetic tape, a floppy disk, an optical data storage device, the other types of storage mediums presented herein, and combinations thereof. If desired, the computer-readable medium may be realized in the form of a carrier wave (e.g., transmission over Internet). Thus, the foregoing description is merely an example and is not to be considered as limiting the present disclosure. The scope of the present disclosure should be determined by rational interpretation of the appended claims, and all changes within the equivalent range of the present disclosure are included in the scope of the present disclosure.

What is claimed is:

1. A method of identifying a behavior direction recognition based service requester, the method comprising:
   tracking a plurality of users in a captured image to obtain movement information of the plurality of users, wherein the plurality of users includes a first user and a second user; learning the obtained movement information of the plurality of users;
   determining whether or not the first user is in a wandering state based on the learned movement information of the first user; and
   determining whether or not an intelligent robot device approaches the first user depending on whether or not the first user is in the wandering state,
   wherein downlink control information (DCI), that is used to schedule a transmission of the movement information of the first user transmitted from a server, is received from a network, wherein the movement information of the first user is transmitted to the network based on the DCI.

2. The method of claim 1, wherein the method further comprises comparing learned movement information of the first user with learned movement information of the second user and grouping the first user and the second user into the same group if a result of the comparison is included in a predetermined range.

3. The method of claim 1, wherein the movement information of the first user includes at least one of a directionality of the first user, a direction value of the first user, a movement path of the first user, a slope of a movement path of the first user, or a movement speed of the first user.

4. The method of claim 1, wherein the determining whether or not the first user is in the wandering state based on the learned movement information of the first user comprises:
   extracting feature values from the movement information of the first user;
   inputting the feature values to an artificial neural network (ANN) classifier to distinguish whether or not the first user is in the wandering state; and
   determining whether or not the first user is in the wandering state from an output of the artificial neural network.

5. The method of claim 4, wherein the feature values are values that are able to distinguish whether or not the first user is in the wandering state.

6. The method of claim 1, wherein determining whether or not the intelligent robot device approaches the first user comprises:
   controlling the intelligent robot device to approach the first user or approach around the first user if it is determined that the first user is in the wandering state based on a result of learning.

7. The method of claim 4, wherein the determining whether or not the first user is in the wandering state based on the learned movement information of the first user comprises:

giving different weight values to the extracted feature values.

8. The method of claim 1, wherein an initial connection procedure is performed with the network based on a synchronization signal block (SSB), wherein the movement information of the first user is transmitted to the network via a PUSCH, wherein DM-RSs of the SSB and the PUSCH are quasi co-located (QCL) to a QCL type D.

9. The method of claim 8, wherein a communication unit is controlled to transmit the movement information of the first user to an AI processor included in the network,
wherein the communication unit is controlled to receive information that is AI-processed by the AI processor,
wherein the AI-processed information is information that determines whether or not the first user is in the wandering state.

10. The method of claim 1, wherein the intelligent robot device provides airport services to the first user while moving in an airport.

11. The method of claim 3, wherein the movement information of the first user includes a directionality of the first user.

12. The method of claim 3, wherein the movement information of the first user includes a direction value of the first user.

13. The method of claim 3, wherein the movement information of the first user includes a movement path of the first user.

14. The method of claim 3, wherein the movement information of the first user includes a slope of a movement path of the first user.

15. The method of claim 3, wherein the movement information of the first user includes a movement speed of the first user.

* * * * *